(12) United States Patent
Matsumura et al.

(10) Patent No.: US 12,445,970 B2
(45) Date of Patent: Oct. 14, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 395 days.

(21) Appl. No.: 18/004,991

(22) PCT Filed: Jul. 30, 2020

(86) PCT No.: PCT/JP2020/029250
§ 371 (c)(1),
(2) Date: Jan. 10, 2023

(87) PCT Pub. No.: WO2022/024298
PCT Pub. Date: Feb. 3, 2022

(65) Prior Publication Data
US 2023/0254776 A1    Aug. 10, 2023

(51) Int. Cl.
*H04W 52/24* (2009.01)
*H04W 72/232* (2023.01)

(52) U.S. Cl.
CPC ......... *H04W 52/24* (2013.01); *H04W 72/232* (2023.01)

(58) Field of Classification Search
CPC . H04W 52/24; H04W 72/232; H04W 52/146; H04W 52/325; H04W 52/42; H04W 52/54; H04L 5/0044; H04L 5/0091
See application file for complete search history.

(56) References Cited

U.S. PATENT DOCUMENTS

| | | | |
|---|---|---|---|
| 12,267,857 B2 * | 4/2025 | Park | H04W 72/53 |
| 2009/0245191 A1 * | 10/2009 | Ball | H04W 52/365 |
| | | | 455/127.1 |

(Continued)

FOREIGN PATENT DOCUMENTS

| | | |
|---|---|---|
| CN | 111093257 A | 5/2020 |
| WO | 2020044409 A1 | 3/2020 |
| WO | 2020144775 A1 | 7/2020 |

OTHER PUBLICATIONS

Office Action issued in Chinese Application No. 202080105634.7, dated Jun. 27, 2024 (14 pages).

(Continued)

*Primary Examiner* — Hoang-Chuong Q Vu
(74) *Attorney, Agent, or Firm* — Osha Bergman Watanabe & Burton LLP

(57) ABSTRACT

A terminal according to one aspect of the present disclosure includes: a receiving section that receives downlink control information (DCI) including specific information different from a sounding reference signal resource indicator (SRI), and receives mapping between the specific information and a parameter related to uplink shared channel (PUSCH) transmission power control by using higher layer signaling; and a control section that determines a parameter used for the PUSCH transmission power control, based on the specific information and the mapping. According to one aspect of the present disclosure, parameters related to UL transmission power control can be appropriately determined.

4 Claims, 22 Drawing Sheets

(56) References Cited

U.S. PATENT DOCUMENTS

| | | | |
|---|---|---|---|
| 2020/0383089 A1* | 12/2020 | Goto | H04L 1/1822 |
| 2021/0184819 A1 | 6/2021 | Takeda et al. | |
| 2021/0185512 A1* | 6/2021 | Zhou | H04B 7/0695 |
| 2023/0023600 A1* | 1/2023 | Cirik | H04W 52/242 |
| 2023/0039771 A1* | 2/2023 | Liu | H04L 5/0048 |
| 2023/0059644 A1* | 2/2023 | Yuan | H04W 52/42 |
| 2023/0077060 A1* | 3/2023 | Guo | H04W 72/1268 |
| 2023/0127256 A1* | 4/2023 | Cha | H04W 52/242 |
| | | | 370/318 |
| 2023/0164699 A1* | 5/2023 | Yuan | H04W 52/226 |
| | | | 455/522 |
| 2023/0171763 A1* | 6/2023 | Gao | H04W 52/08 |
| | | | 370/329 |

OTHER PUBLICATIONS

Office Action issued in Japanese Application No. 2022-539898, mailed Sep. 24, 2024 (8 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

3GPP TSG RAN WG1 Meeting #101-e; R1-2003483 "Preliminary views on further enhancement for NR MIMO" ZTE; e-Meeting, May 25-Jun. 5, 2020 (18 pages).

3GPP TSG RAN WG1 Meeting 90bis; R1-1718238 "Beam indication for control and data channels" Huawei, HiSilicon; Prague, Czech Republic; Oct. 9-13, 2017 (8 pages).

International Search Report issued in International Application No. PCT/JP2020/029250, mailed Feb. 22, 2021 (3 pages).

Written Opinion issued in International Application No. PCT/JP2020/029250; Dated Feb. 22, 2021 (3 pages).

Office Action issued in Chinese Patent Application No. 202080105634.7, dated Jan. 11, 2025 (21 pages).

* cited by examiner

```
TCI-State ::=            SEQUENCE {
    tci-StateId              TCI-StateId,
    qcl-Type1                QCL-Info,
    qcl-Type2                QCL-Info,             OPTIONAL,     -- Need R
    ...
}

QCL-Info ::=             SEQUENCE {
    cell                     ServCellIndex                       OPTIONAL,     -- Need R
    bwp-Id                   BWP-Id                              OPTIONAL,     -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED (typeA, typeB, typeC, typeD),
    ...
}
```

```
PUCCH-SpatialRelationInfo::=      SEQUENCE {
 pucch-SpatialRelationInfoId      PUCCH-SpatialRelationInfoId,
 servingCellId                    ServCellIndex                      OPTIONAL,    -- Need S
 referenceSignal                  CHOICE {
  ssb-Index                        SSB-Index,
  csi-RS-Index                     NZP-CSI-RS-ResourceId,
  srs                              SEQUENCE {
                                    resource          SRS-ResourceId,
                                    uplinkBWP         BWP-Id
                                   }
 },
 pucch-PathlossReferenceRS-Id     PUCCH-PathlossReferenceRS-Id
 p0-PUCCH-Id                      P0-PUCCH-Id,
 closedLoopIndex                  ENUMERATED { i0, i1 }
}
```

FIG. 2B

```
SRS-SpatialRelationInfo ::=       SEQUENCE {
 servingCellId                    ServCellIndex                      OPTIONAL,    -- Need S
 referenceSignal                  CHOICE {
  ssb-Index                        SSB-Index,
  csi-RS-Index                     NZP-CSI-RS-ResourceId,
  srs                              SEQUENCE {
   resourceId                       SRS-ResourceId,
   uplinkBWP                        BWP-Id
                                   }
  }
}
```

FIG. 3A

```
SpatialRelationInfo-r17 ::=    SEQUENCE {
    spatialRelationInfoId          SpatialRelationInfoIndex
    servingCellId                  ServCellIndex
    referenceSignal                CHOICE {
        ssb-Index                      SSB-Index,
        csi-RS-Index                   NZP-CSI-RS-ResourceId,
        srs                            SEQUENCE {
            resourceId                     SRS-ResourceId,
            uplinkBWP                      BWP-Id
        }
    }
}
```

FIG. 3B

```
SpatialRelationInfo-r17 ::=    SEQUENCE {
    spatialRelationInfoId          SpatialRelationInfoIndex
    servingCellId                  ServCellIndex
    panelId                        PanelIndex
    referenceSignal                CHOICE {
        ssb-Index                      SSB-Index,
        csi-RS-Index                   NZP-CSI-RS-ResourceId,
        srs                            SEQUENCE {
            resourceId                     SRS-ResourceId,
            uplinkBWP                      BWP-Id
        }
    }
}
```

```
PUCCH-SpatialRelationInfo-r16 ::=       SEQUENCE {
    pucch-SpatialRelationInfoId-r16         PUCCH-SpatialRelationInfoId-r16,
    servingCellId-r16                       ServCellIndex
OPTIONAL,   -- Need S
    referenceSignal-r16                     CHOICE {
        ssb-Index                               SSB-Index,
        csi-RS-Index                            NZP-CSI-RS-ResourceId,
        srs                                     PUCCH-SRS
    },
    pucch-PathlossReferenceRS-Id-r16        PUCCH-PathlossReferenceRS-Id-r16,
    p0-PUCCH-Id-r16                         P0-PUCCH-Id,
    closedLoopIndex-r16                     ENUMERATED { i0, i1 }
}
```

FIG. 4

```
PUCCH-PowerControl ::=         SEQUENCE {
    deltaF-PUCCH-f0                INTEGER (-16..15)                                          OPTIONAL,    -- Need R
    deltaF-PUCCH-f1                INTEGER (-16..15)                                          OPTIONAL,    -- Need R
    deltaF-PUCCH-f2                INTEGER (-16..15)                                          OPTIONAL,    -- Need R
    deltaF-PUCCH-f3                INTEGER (-16..15)                                          OPTIONAL,    -- Need R
    deltaF-PUCCH-f4                INTEGER (-16..15)                                          OPTIONAL,    -- Need R
    p0-Set                         SEQUENCE (SIZE (1..maxNrofPUCCH-P0-PerSet)) OF P0-PUCCH    OPTIONAL,    -- Need M
    pathlossReferenceRSs           SEQUENCE (SIZE (1..maxNrofPUCCH-PathlossReferenceRSs)) OF PUCCH-PathlossReferenceRS
                                                                                              OPTIONAL,    -- Need M
    twoPUCCH-PC-AdjustmentStates   ENUMERATED {twoStates}                                     OPTIONAL,    -- Need S
    ...
}

P0-PUCCH ::=                   SEQUENCE {
    p0-PUCCH-Id                    P0-PUCCH-Id,
    p0-PUCCH-Value                 INTEGER (-16..15)
}

P0-PUCCH-Id ::=                INTEGER (1..8)

PUCCH-PathlossReferenceRS ::=  SEQUENCE {
    pucch-PathlossReferenceRS-Id   PUCCH-PathlossReferenceRS-Id,
    referenceSignal                CHOICE {
        ssb-Index                      SSB-Index,
        csi-RS-Index                   NZP-CSI-RS-ResourceId
    }
}
```

FIG. 5

```
PUCCH-PowerControl-r17 ::=         SEQUENCE {
    ......
    p0-Set                         SEQUENCE (SIZE (1..maxNrofPUCCH-P0-PerSet)) OF P0-PUCCH               OPTIONAL, -- Need M
    pathlossReferenceRSs           SEQUENCE (SIZE (1..maxNrofPUCCH-PathlossReferenceRSs)) OF PUCCH-PathlossReferenceRS
                                                                                                        OPTIONAL, -- Need M
    twoPUCCH-PC-AdjustmentStates   ENUMERATED {twoStates}                                               OPTIONAL, -- Need S
    ...,
    ULTCI-PUCCH-mapping-r17        SEQUENCE (SIZE (1..maxNrofULTCI-PUCCH-PowerControl)) OF ULTCI-PUCCH-PowerControl-r17
}
......
ULTCI-PUCCH-PowerControl-r17 ::=   SEQUENCE {
    spatialRelationInfoId-r17           SpatialRelationInfoIndex-r17
    pucch-PathlossReferenceRS-Id        pucch-PathlossReferenceRS-Id
    p0-PUCCH-Id                         p0-PUCCH-Id
    pucch-closedLoopIndex               ENUMERATED {i0,i1}
}
```

FIG. 6

```
ULTCI-PUCCH-mapping-config-r17 ::=       SEQUENCE {
    ULTCI-PUCCH-mapping-r17              SEQUENCE (SIZE (1..maxNrofULTCI-PUCCH-PowerControl)) OF ULTCI-PUCCH-PowerControl-r17
}

ULTCI-PUCCH-PowerControl-r17 ::=         SEQUENCE {
    spatialRelationInfoId-r17                SpatialRelationInfoIndex-r17
    pucch-PathlossReferenceRS-Id             pucch-PathlossReferenceRS-Id
    p0-PUCCH-Id                              p0-PUCCH-Id
    pucch-closedLoopIndex                    ENUMERATED {i0,i1}
}
```

FIG. 7

```
SpatialRelationInfo-r17 ::=       SEQUENCE {
    spatialRelationInfoId-r17         SpatialRelationInfoIndex-r17
    servingCellId                     ServCellIndex
    referenceSignal                   CHOICE {
        ssb-Index                         SSB-Index,
        csi-RS-Index                      NZP-CSI-RS-ResourceId,
        srs                               SEQUENCE {
            resourceId                        SRS-ResourceId,
            uplinkBWP                         BWP-Id
        }
    }
    pucch-PathlossReferenceRS-Id      pucch-PathlossReferenceRS-Id
    p0-PUCCH-Id                       p0-PUCCH-Id
    pucch-closedLoopIndex             ENUMERATED {i0,i1}
}
```

FIG. 8

```
SpatialRelationInfo-r17 ::=         SEQUENCE {
    spatialRelationInfoId-r17               SpatialRelationInfoIndex-r17
    servingCellId                           ServCellIndex
    referenceSignal             CHOICE {
        ssb-Index                   SSB-Index,
        csi-RS-Index                NZP-CSI-RS-ResourceId,
        srs                         SEQUENCE {
            resourceId                  SRS-ResourceId,
            uplinkBWP                   BWP-Id
        }
    }
    pucch-PathlossReferenceRS-Config-r17 ::=    CHOICE {
        ssb-Index                   SSB-Index,
        csi-RS-Index                NZP-CSI-RS-ResourceId
    }
    p0-PUCCH-value                          INTEGER (-16..15)
    pucch-closedLoopIndex                   ENUMERATED {i0,i1}
}
```

FIG. 9

```
PUSCH-PowerControl ::=          SEQUENCE {
   .....
   sri-PUSCH-MappingToAddModList    SEQUENCE (SIZE (1..maxNrofSRI-PUSCH-Mappings)) OF SRI-PUSCH-PowerControl
   .....
OPTIONAL,  -- Need N
}
...

SRI-PUSCH-PowerControl ::=      SEQUENCE {
   sri-PUSCH-PowerControlId          SRI-PUSCH-PowerControlId,
   sri-PUSCH-PathlossReferenceRS-Id  PUSCH-PathlossReferenceRS-Id,
   sri-P0-PUSCH-AlphaSetId           P0-PUSCH-AlphaSetId,
   sri-PUSCH-ClosedLoopIndex         ENUMERATED { i0, i1 }
}
```

FIG. 10

```
PUSCH-PowerControl-r17 ::=         SEQUENCE {
    ......
    ULTCI-PUSCH-MappingToAddModList-r17      SEQUENCE (SIZE (1..maxNrofULTCI-PUSCH-Mappings)) OF ULTCI-PUSCH-
PowerControl-r17
    ......
OPTIONAL, -- Need N
}
...
ULTCI-PUSCH-PowerControl-r17 ::=   SEQUENCE {
ULTCI-PUSCH-PowerControlId-r17     ULTCI-PUSCH-PowerControlId-r17,
ULTCI-PUSCH-PathlossReferenceRS-Id PUSCH-PathlossReferenceRS-Id,
ULTCI-P0-PUSCH-AlphaSetId          P0-PUSCH-AlphaSetId,
ULTCI-PUSCH-ClosedLoopIndex        ENUMERATED { i0, i1 }
}
```

FIG. 11

```
PUSCH-PowerControl-r17 ::=        SEQUENCE {
    ......
    ULTCI-PUSCH-Mapping-r17       SEQUENCE (SIZE (1..maxNrofULTCI-PUSCH-PowerControl)) OF ULTCI-PUSCH-
PowerControl-r17
    ......
OPTIONAL,  -- Need N
}
ULTCI-PUSCH-PowerControl-r17 ::=  SEQUENCE {
    spatialRelationInfoId-r17            SpatialRelationInfoIndex-r17
    pusch-PathlossReferenceRS-Id         PUSCH-PathlossReferenceRS-Id
    P0-PUSCH-AlphaSetId                  P0-PUSCH-AlphaSetId,
    PUSCH-ClosedLoopIndex                ENUMERATED { i0, i1 } }
}
```

FIG. 12

```
ULTCI-PUSCH-mapping-config-r17 ::=      SEQUENCE {
    ULTCI-PUSCH-mapping-r17     SEQUENCE (SIZE (1..maxNrofULTCI-PUCCH-PowerControl)) OF ULTCI-PUSCH-PowerControl-r17
}
ULTCI-PUSCH-PowerControl-r17 ::= SEQUENCE {
    spatialRelationInfoId-r17       SpatialRelationInfoIndex-r17
    pusch-PathlossReferenceRS-Id    PUSCH-PathlossReferenceRS-Id
    P0-PUSCH-AlphaSetId             P0-PUSCH-AlphaSetId,
    PUSCH-ClosedLoopIndex           ENUMERATED { i0, i1 }
}
```

FIG. 13

```
SRS-ResourceSet ::=             SEQUENCE {
    srs-ResourceSetId           SRS-ResourceSetId,
    srs-ResourceIdList          SEQUENCE (SIZE(1..maxNrofSRS-ResourcesPerSet)) OF SRS-ResourceId    OPTIONAL,   -- Cond Setup
    ......
    alpha                       Alpha                                                               OPTIONAL,   -- Need S
    p0                          INTEGER (-202..24)                                                  OPTIONAL,   -- Cond Setup
    pathlossReferenceRS         PathlossReferenceRS-Config                                          OPTIONAL,   -- Need M
    srs-PowerControlAdjustmentStates    ENUMERATED { sameAsFci2, separateClosedLoop}                OPTIONAL,   -- Need S
    ...,
    [[
    pathlossReferenceRS-List-r16    SEQUENCE (SIZE(1..maxNrofSRS-PathlossReferenceRS-r16-1)) OF PathlossReferenceRS-Config                                                                              OPTIONAL,   -- Need M
    ]]
}
```

```
ULTCI-PathlossReferenceRS-config-r17 ::=     SEQUENCE{
    UL-TCIPathlossReferenceRS-r17            SEQUENCE (SIZE (1..maxNrofPathlossReferenceRSs)) OF PathlossReferenceRS-r17
}

PathlossReferenceRS-r17                      SEQUENCE{
    PathlossReferenceRS-Id-r17               PathlossReferenceRS-Id-r17
    referenceSignal                          CHOICE {
        ssb-Index                                SSB-Index,
        csi-RS-Index                             NZP-CSI-RS-ResourceId
    }
}
```

FIG. 15B

```
SpatialRelationInfo-r17 ::=     SEQUENCE {
    spatialRelationInfoId-r17       SpatialRelationInfoIndex
    servingCellId                   ServCellIndex
    referenceSignal                 CHOICE {
        ssb-Index                       SSB-Index,
        csi-RS-Index                    NZP-CSI-RS-ResourceId,
        srs                             SEQUENCE {
            resourceId                      SRS-ResourceId,
            uplinkBWP                       BWP-Id
        }
    }
    PathlossReferenceRS-Id-r17      PathlossReferenceRS-Id-r17
    ......
}
```

```
SpatialRelationInfo-r17 ::=    SEQUENCE {
    spatialRelationInfoId-r17           SpatialRelationInfoIndex
    servingCellId                       ServCellIndex
    referenceSignal        CHOICE {
        ssb-Index          SSB-Index,
        csi-RS-Index       NZP-CSI-RS-ResourceId,
        srs                SEQUENCE {
            resourceId         SRS-ResourceId,
            uplinkBWP          BWP-Id
        }
    }
}

PathlossReferenceRS-Config-r17 ::=    CHOICE {
    ssb-Index          SSB-Index,
    csi-RS-Index       NZP-CSI-RS-ResourceId
}
.....
}
```

FIG. 16

```
ULTCI-PathlossReferenceRS-config-r17 ::=    SEQUENCE{
    UL-TCIPathlossReferenceRS-r17               SEQUENCE (SIZE (1..maxNrofPathlossReferenceRSs)) OF PathlossReferenceRS-r17
    ULTCI-PLRS-mapping-r17                      SEQUENCE (SIZE (1..maxNrofULTCI-PLRS))   OF ULTCI-PLRS-r17
}

PathlossReferenceRS-r17                 SEQUENCE{
    PathlossReferenceRS-Id-r17              PathlossReferenceRS-Id-r17
    referenceSignal                         CHOICE {
        ssb-Index                               SSB-Index,
        csi-RS-Index                            NZP-CSI-RS-ResourceId
    }
}

ULTCI-PLRS-r17 ::=                      SEQUENCE {
    spatialRelationInfoId-r17               SpatialRelationInfoIndex
    PathlossReferenceRS-Id-r17              PathlossReferenceRS-Id-r17,
}
```

```
ULTCI-PathlossReferenceRS-config-r17 ::=    SEQUENCE{
    UL-TCIPathlossReferenceRSs-r17          SEQUENCE (SIZE (1..maxNrofPathlossReferenceRSs)) OF PathlossReferenceRSs
}

PathlossReferenceRS-r17                     SEQUENCE{
    PathlossReferenceRS-Id-r17              PathlossReferenceRS-Id-r17
    referenceSignal                         CHOICE {
        ssb-Index                               SSB-Index,
        csi-RS-Index                            NZP-CSI-RS-ResourceId
    }
}
```

FIG. 18B

```
ULTCI-PLRS-mapping-config-r17 ::=           SEQUENCE {
    ULTCI-PLRS-mapping-r17                  SEQUENCE (SIZE (1..maxNrofULTCI-PLRS))  OF ULTCI-PLRS-r17
}

ULTCI-PLRS-r17 ::=                          SEQUENCE {
    spatialRelationInfoId-r17                   SpatialRelationInfoIndex
    PathlossReferenceRS-Id-r17                  PathlossReferenceRS-Id-r17,
}
```

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., also referred to as "5th generation mobile communication system (5G)," "5G+ (plus)," "6th generation mobile communication system (6G)," "New Radio (NR)," "3GPP Rel. 15 or later versions," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR of Rel. 17 or later versions), a transmission configuration indication state of an uplink (UL) (Uplink Transmission Configuration Indication state (UL TCI state)) has been under study as a beam indication method of a UL for a user terminal (User Equipment (UE)).

However, a study of how the UE determines parameters related to UL transmission power control in consideration of the UL TCI state, spatial relation information, and the like scheduled to be adopted in the future radio communication systems has not yet been under development. Unless the parameters related to the UL transmission power control are appropriately determined, communication throughput may be deteriorated.

In the light of this, the present disclosure has an object to provide a terminal, a radio communication method, and a base station that enable appropriate determination of parameters related to UL transmission power control.

Solution to Problem

A terminal according to one aspect of the present disclosure includes: a receiving section that receives downlink control information (DCI) including specific information different from a sounding reference signal resource indicator (SRI), and receives mapping between the specific information and a parameter related to uplink shared channel (PUSCH) transmission power control by using higher layer signaling; and a control section that determines a parameter used for the PUSCH transmission power control, based on the specific information and the mapping.

Advantageous Effects of Invention

According to one aspect of the present disclosure, parameters related to UL transmission power control can be appropriately determined.

BRIEF DESCRIPTION OF DRAWINGS

FIG. 1 is a diagram to show an example of information elements related to an existing TCI state;

FIG. 2A is a diagram to show an example of existing PUCCH spatial relation information; FIG. 2B is a diagram to show an example of existing spatial relation information of an SRS;

FIG. 3A is a diagram to show an example of information related to spatial relation between a reference RS and a target RS; FIG. 3B is a diagram to show an example of information related to spatial relation between a reference RS and a target RS;

FIG. 4 is a diagram to show PUCCH spatial relation information according to Rel. 16;

FIG. 5 is a diagram to show PUCCH power control information according to Rel. 16;

FIG. 6 is a diagram to show an example of a PUCCH power control information element according to aspect 1-1;

FIG. 7 is a diagram to show an example of a ULTCI-PUCCH mapping configuration information element according to aspect 1-1;

FIG. 8 is a diagram to show a first example of spatial relation information according to aspect 1-2;

FIG. 9 is a diagram to show a second example of spatial relation information according to aspect 1-2;

FIG. 10 is a diagram to show an example of a parameter related to power control of a PUSCH according to Rel. 16;

FIG. 11 is a diagram to show an example of a parameter related to power control of a PUSCH according to aspect 2-2;

FIG. 12 is a diagram to show an example of a PUSCH power control information element according to aspect 2-3;

FIG. 13 is a diagram to show an example of a ULTCI-PUSCH mapping configuration information element according to aspect 2-3;

FIG. 14 is a diagram to show an example of a parameter related to power control of an SRS according to Rel. 16;

FIG. 15A is a diagram to show path loss reference RS configuration information according to aspect 3-1; FIG. 15B is a diagram to show spatial relation information according to aspect 3-1;

FIG. 16 is a diagram to show spatial relation information according to aspect 3-2;

FIG. 17 is a diagram to show ULTCI path loss reference RS configuration information according to aspect 3-3;

FIG. 18A is a diagram to show ULTCI path loss reference RS configuration information according to aspect 3-4;

FIG. 18B is a diagram to show ULTCI path loss RS mapping configuration information according to aspect 3-4;

Figure 19:
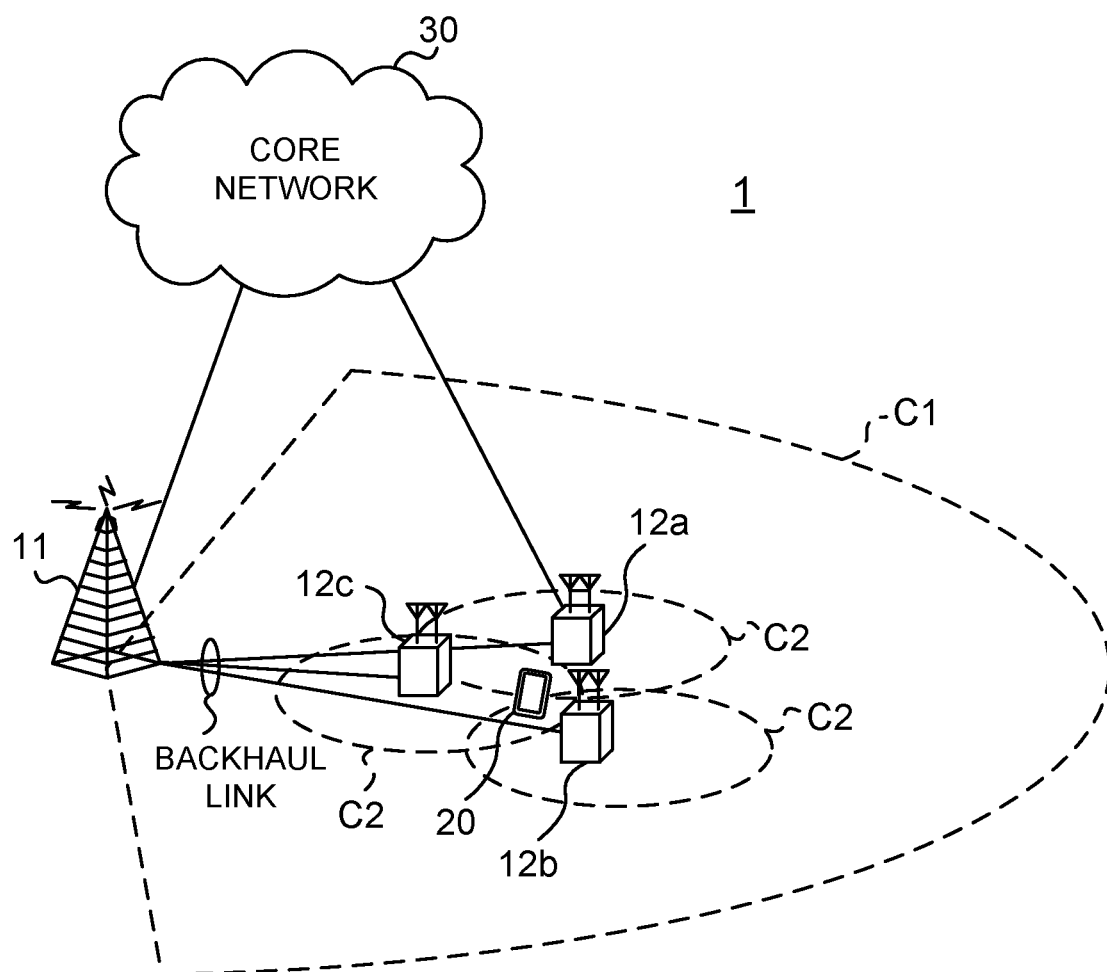
FIG. 19 is a diagram to show an example of a schematic structure of a radio communication system according to one embodiment.

DESCRIPTION OF EMBODIMENTS (TCI, Spatial Relation, QCL)

For NR, the following has been under study: a UE controls reception processing (for example, at least one of reception, demapping, demodulation, and decoding), transmission processing (for example, at least one of transmission, mapping, precoding, modulation, and coding), and the like of at least one of a signal and a channel (which may be referred to as a signal/channel; in the present disclosure, in a similar manner, "A/B" may be interpreted as "at least one of A and B"), based on a transmission configuration indication state (TCI state).

The TCI state may be a state applied to a downlink signal/channel. A state corresponding to the TCI state applied to an uplink signal/channel may be expressed as spatial relation.

The TCI state is information related to quasi-co-location (QCL) of a signal/channel, and may be referred to as a spatial reception parameter, spatial relation information, or the like. The TCI state may be configured for the UE for each channel or each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter Types A to C may correspond to QCL information related to synchronization processing of at least one of time and frequency, and type D may correspond to QCL information related to beam control.

A state that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or QCL assumption of the signal/channel.

The TCI state may be, for example, information related to QCL between a channel being a target (or a reference signal (RS) for the channel) and another signal (for example, another downlink reference signal (DL-RS)). The TCI state may be configured (indicated) by using higher layer signaling, physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that the channel/signal as an application target of the TCI state may be referred to as a target channel/RS or simply as a target or the like, and the other signal may be referred to as a reference RS or simply as a reference or the like.

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

Further, the RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The UE may receive configuration information (for example, PDSCH-Config or tci-StatesToAddModList) including a list of information elements of the TCI state by using higher layer signaling.

The information element ("TCI-state IE" of RRC) of the TCI state configured by using higher layer signaling may include a TCI state ID and one or a plurality of pieces of QCL information ("QCL-Info"). The QCL information may include at least one of information related to the RS to have a QCL relationship (RS relation information) and information indicating the QCL type (QCL type information). The RS relation information may include information such as an index of the RS (for example, an SSB index or a non-zero power CSI-RS (Non-Zero-Power (NZP) CSI-RS) resource ID (Identifier)), an index of a cell in which the RS is located, and an index of a Bandwidth Part (BWP) in which the RS is located.

In Rel. 15 NR, as the TCI state of at least one of the PDCCH and the PDSCH, both of the RS of QCL type A and the RS of QCL type D, or only the RS of QCL type A may be configured for the UE.

When the TRS is configured as the RS of QCL type A, regarding the TRS, it is assumed that the same TRS is periodically transmitted for a long period of time, unlike the demodulation reference signal (DMRS) of the PDCCH or the PDSCH. The UE can measure the TRS, and calculate the average delay, the delay spread, and the like.

The UE for which the TRS is configured as the RS of QCL type A in the TCI state of the DMRS of the PDCCH or the PDSCH can assume that the parameters (the average delay, the delay spread, and the like) of QCL type A of the TRS are the same as those of the DMRS of the PDCCH or the PDSCH, and can thus calculate the parameters (the average delay, the delay spread, and the like) of type A of the DMRS of the PDCCH or the PDSCH, based on measurement results of the TRS. When the UE performs channel estimation of at least one of the PDCCH and the PDSCH, the UE can perform channel estimation of higher accuracy by using the measurement results of the TRS.

The UE for which the RS of QCL type D is configured can determine a UE receive beam (spatial domain reception filter, UE spatial domain reception filter) by using the RS of QCL type D.

The RS of QCL type X of the TCI state may mean an RS that is in a relationship of QCL type X with a certain channel/signal (the DMRS thereof), and the RS may be referred to as a QCL source of QCL type X of the TCI state.

FIG. 1 is a diagram to show an example of information elements related to an existing TCI state. By using the information elements as shown in FIG. 1, the UE may receive information related to the TCI state.

<Spatial Relation for PUCCH>

For the UE, parameters (PUCCH configuration information, PUCCH-Config) used for PUCCH transmission may be configured by using higher layer signaling (for example, Radio Resource Control (RRC) signaling). The PUCCH configuration information may be configured for each partial band (for example, an uplink bandwidth part (BWP)) in a carrier (also referred to as a cell or a component carrier (CC)).

The PUCCH configuration information may include a list of pieces of PUCCH resource set information (for example, PUCCH-ResourceSet) and a list of pieces of PUCCH spatial relation information (for example, PUCCH-SpatialRelation-Info).

The PUCCH resource set information may include a list (for example, resourceList) of PUCCH resource indexes (IDs, for example, PUCCH-ResourceId).

Further, if the UE does not have dedicated PUCCH resource configuration information (for example, dedicated PUCCH resource configuration) provided by the PUCCH resource set information in the PUCCH configuration information (before RRC setup), the UE may determine the PUCCH resource set, based on a parameter (for example, pucch-ResourceCommon) in system information (for example, System Information Block Type 1 (SIB1) or Remaining Minimum System Information (RMSI)). The PUCCH resource set may include 16 PUCCH resources.

On the other hand, if the UE has the dedicated PUCCH resource configuration information (UE-dedicated uplink control channel configuration, dedicated PUCCH resource configuration) (after RRC setup), the UE may determine the PUCCH resource set, according to the number of UCI information bits.

The UE may determine one PUCCH resource (index) in the PUCCH resource set (for example, the PUCCH resource set determined to be specific to the cell or dedicated to the UE), based on at least one of a value of a certain field (for example, a PUCCH resource indication (PUCCH resource indicator) field) in downlink control information (DCI) (for example, DCI format 1_0 or 1_1 used for scheduling of the PDSCH), the number ($N_{CCE}$) of CCEs in the control resource set (CORESET) for PDCCH reception for carrying the DCI, and an index ($n_{CCE,0}$) of the first CCE of the PDCCH reception.

The PUCCH spatial relation information (for example, "PUCCH-spatialRelationInfo" of an RRC information element) may indicate a plurality of candidate beams (spatial domain filters) for PUCCH transmission. The PUCCH spatial relation information may indicate a spatial relationship between the RS (Reference signal) and the PUCCH.

FIG. 2A is a diagram to show an example of existing PUCCH spatial relation information. By using the information (for example, RRC information elements) as shown in FIG. 2A, the UE may receive the PUCCH spatial relation information.

Note that, in the present disclosure, an index, an ID, an indicator, a resource ID, and the like may be interchangeably interpreted as each other.

The list of pieces of PUCCH spatial relation information may include some elements (PUCCH spatial relation information IEs (Information Elements)). Each piece of PUCCH spatial relation information may include, for example, at least one of pieces of information related to an index (ID, for example, pucch-SpatialRelationInfoId) of the PUCCH spatial relation information, an index (ID, for example, servingCellId) of the serving cell, and an RS (reference RS) to be in spatial relation with the PUCCH.

For example, information related to the RS may be an SSB index, a CSI-RS index (for example, an NZP-CSI-RS resource configuration ID), or an SRS resource ID and an ID of the BWP. The SSB index, the CSI-RS index, and the SRS resource ID may be associated with at least one of a beam, a resource, and a port selected through measurement of a corresponding RS.

When more than one piece of spatial relation information related to the PUCCH is configured for the UE, the UE may perform control so that one piece of PUCCH spatial relation information is active for one PUCCH resource at certain time, based on a PUCCH spatial relation activation/deactivation MAC CE.

The PUCCH spatial relation activation/deactivation MAC CE according to Rel. 15 NR is expressed with a total of three octets (8 bits x 3=24 bits) of octets (Oct) 1 to 3.

The MAC CE may include information of a serving cell ID ("Serving Cell ID" field) of an application target, a BWP ID ("BWP ID" field), a PUCCH resource ID ("PUCCH Resource ID" field), and the like.

Further, the MAC CE includes a field of "$S_i$" (i=0 to 7). When the field of certain $S_i$ indicates 1, the UE activates the spatial relation information of spatial relation information ID #i. When the field of certain $S_i$ indicates 0, the UE deactivates the spatial relation information of spatial relation information ID #i.

After 3 ms have passed since the UE has transmitted a positive response (ACK) for the MAC CE for activating certain PUCCH spatial relation information, the UE may activate the PUCCH relation information specified by the MAC CE.

<Spatial Relation for SRS and PUSCH>

The UE may receive information (SRS configuration information, for example, a parameter in "SRS-Config" of the RRC control element) that is used for transmission of a reference signal for measurement (for example, a sounding reference signal (SRS)).

Specifically, the UE may receive at least one of information related to one or a plurality of SRS resource sets (SRS resource set information, for example, "SRS-ResourceSet" of the RRC control element) and information related to one or a plurality of SRS resources (SRS resource information, for example, "SRS-Resource" of the RRC control element).

One SRS resource set may be related to a certain number of SRS resources (the certain number of SRS resources may be grouped together). Each SRS resource may be identified by an SRS resource identifier (SRS Resource Indicator (SRI)) or an SRS resource ID (Identifier).

The SRS resource set information may include information of an SRS resource set ID (SRS-ResourceSetId), a list of SRS resource IDs (SRS-ResourceId) used in the resource set, an SRS resource type, and a usage of the SRS.

Here, the SRS resource type may indicate any one of a periodic SRS (P-SRS), a semi-persistent SRS (SP-SRS), and an aperiodic SRS (A-SRS or AP-SRS). Note that the UE may periodically (or periodically after activation) transmit the P-SRS and the SP-SRS, and transmit the A-SRS, based on an SRS request of the DCI.

Further, the usage ("usage" of an RRC parameter, "SRS-SetUse" of an L1 (Layer-1) parameter) may be, for example, beam management (beamManagement), codebook-based transmission (codebook (CB)), non-codebook-based transmission (nonCodebook (NCB)), antenna switching (antennaSwitching), or the like. The SRS of the usage of codebook-based transmission or non-codebook-based transmission may be used for determination of a precoder of codebook-based or non-codebook-based PUSCH transmission based on the SRI.

For example, in a case of codebook-based transmission, the UE may determine a precoder for PUSCH transmission, based on the SRI, a transmitted rank indicator (TRI), and a transmitted precoding matrix indicator (TPMI). In a case of non-codebook-based transmission, the UE may determine a precoder for PUSCH transmission, based on the SRI.

The SRS resource information may include an SRS resource ID (SRS-ResourceId), the number of SRS ports, an SRS port number, transmission Comb, SRS resource mapping (for example, a time and/or frequency resource position, a resource offset, a period of resources, the number of repetitions, the number of SRS symbols, an SRS bandwidth, or the like), hopping related information, an SRS resource type, a sequence ID, spatial relation information of the SRS, or the like.

The spatial relation information (for example, "spatialRelationInfo" of an RRC information element) of the SRS may indicate spatial relation information between a certain reference signal and the SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

FIG. 2B is a diagram to show an example of existing spatial relation information of the SRS. By using the information (for example, RRC information elements) as shown in FIG. 2B, the UE may receive the spatial relation information of the SRS.

The spatial relation information of the SRS may include at least one of an SSB index, a CSI-RS resource ID, and an SRS resource ID as an index of the certain reference signal.

Note that, in the present disclosure, an SSB index, an SSB resource ID, and an SSBRI (SSB Resource Indicator) may be interchangeably interpreted as each other. Further, a CSI-RS index, a CSI-RS resource ID, and a CRI (CSI-RS Resource Indicator) may be interchangeably interpreted as each other. Further, an SRS index, an SRS resource ID, and an SRI may be interchangeably interpreted as each other.

The spatial relation information of the SRS may include a serving cell index, a BWP index (BWP ID), or the like corresponding to the certain reference signal.

In NR, transmission of an uplink signal may be controlled based on whether or not there is beam correspondence (BC). BC may be, for example, capability of a certain node (for example, the base station or the UE) of determining a beam (transmit beam, Tx beam) used for transmission of a signal, based on a beam (receive beam, Rx beam) used for reception of a signal.

Note that BC may be referred to as transmit/receive beam correspondence (Tx/Rx beam correspondence), beam reciprocity, beam calibration, calibrated/non-calibrated, reciprocity calibrated/non-calibrated, a correspondence degree, a matching degree, or the like.

For example, in a case without BC, the UE may transmit an uplink signal (for example, the PUSCH, the PUCCH, the SRS, or the like) by using the same beam (spatial domain transmission filter) as the SRS (or the SRS resource) indicated by the base station, based on measurement results of one or more SRSs (or SRS resources).

On the other hand, in a case with BC, the UE may transmit an uplink signal (for example, the PUSCH, the PUCCH, the SRS, or the like) by using a beam (spatial domain transmission filter) the same as or corresponding to a beam (spatial domain reception filter) used for reception of a certain SSB or CSI-RS (or CSI-RS resource).

When, regarding a certain SRS resource, the spatial relation information related to the SSB or the CSI-RS and the SRS is configured for the UE (for example, in a case with BC), the UE may transmit the SRS resource by using a spatial domain filter (spatial domain transmission filter) the same as the spatial domain filter (spatial domain reception filter) for reception of the SSB or the CSI-RS. In this case, the UE may assume that the UE receive beam of the SSB or the CSI-RS and the UE transmit beam of the SRS are the same.

When, regarding a certain SRS (target SRS) resource, the spatial relation information related to another SRS (reference SRS) and the SRS (target SRS) is configured for the UE (for example, in a case without BC), the UE may transmit the target SRS resource by using a spatial domain filter (spatial domain transmission filter) the same as the spatial domain filter (spatial domain transmission filter) for transmission of the reference SRS. In other words, in this case, the UE may assume that the UE transmit beam of the reference SRS and the UE transmit beam of the target SRS are the same.

Based on a value of a certain field (for example, an SRS resource indicator (SRI) field) in DCI (for example, DCI format 0_1), the UE may determine spatial relation of the PUSCH scheduled by the DCI. Specifically, the UE may use, for PUSCH transmission, the spatial relation information (for example, "spatialRelationInfo" of an RRC information element) of the SRS resource determined based on a value (for example, the SRI) of the certain field.

When codebook-based transmission is used for the PUSCH, for the UE, two SRS resources may be configured by RRC, and one of the two SRS resources may be indicated by DCI (certain field of 1 bit). When non-codebook-based transmission is used for the PUSCH, for the UE, four SRS resources may be configured by RRC, and one of the four SRS resources may be indicated by DCI (certain field of 2 bits). To use spatial relation other than the spatial relation of two or four configured by RRC, RRC reconfiguration is required.

Note that the DL-RS can be configured for the spatial relation of the SRS resources used for the PUSCH. For example, regarding the SP-SRS, for the UE, spatial relation of a plurality (for example, up to 16) SRS resources can be configured by RRC, and one of the plurality of SRS resources can be indicated by the MAC CE.

<UL TCI State>

In future radio communication systems (for example, NR of Rel. 17 or later versions), as a beam indication method of the UL, the use of a UL TCI state has been under study. The UL TCI state is similar to reporting of a DL beam (DL TCI state) of the UE. Note that the DL TCI state may be interchangeably interpreted as a TCI state for the PDCCH/PDSCH.

A channel/signal (which may be referred to as a target channel/RS) for which the UL TCI state is configured (specified) may be, for example, at least one of the PUSCH (DMRS of the PUSCH), the PUCCH (DMRS of the PUCCH), the random access channel (Physical Random Access Channel (PRACH)), the SRS, and the like.

Further, an RS (source RS) to have a QCL relationship with the channel/signal may be, for example, a DL RS (for example, the SSB, the CSI-RS, the TRS, or the like), or may be a UL RS (for example, the SRS, the SRS for beam management, or the like).

In the UL TCI state, the RS to have a QCL relationship with the channel/signal may be associated with a panel ID for receiving or transmitting the RS. The association may be explicitly configured (or specified) by using higher layer signaling (for example, RRC signaling, the MAC CE, or the like), or may be implicitly determined.

Correspondence between the RS and the panel ID may be configured being included in UL TCI state information, or may be configured being included in at least one of the resource configuration information, the spatial relation information, and the like of the RS.

The QCL type indicated by the UL TCI state may be existing QCL types A to D, may be another QCL type, or may include certain spatial relation, a related antenna port (port index), or the like.

When a related panel ID is specified (for example, specified by using DCI) for the UE regarding UL transmission, the UE may perform the UL transmission by using a panel corresponding to the panel ID. The panel ID may be associated with the UL TCI state, and when the UL TCI state is specified (or activated) for the UE regarding a certain UL channel/signal, the UE may identify a panel to be used for the UL channel/signal transmission, according to the panel ID related to the UL TCI state.

(Multi-TRP)

In NR, a scheme in which one or a plurality of transmission/reception points (TRPs) (multi-TRP) perform DL transmission for the UE by using one or a plurality of panels (multi-panel) has been under study. Further, a scheme in which the UE performs UL transmission for one or a plurality of TRPs has been under study.

Note that the plurality of TRPs may correspond to the same cell identifier (ID), or may correspond to different cell IDs. The cell ID may be a physical cell ID, or a virtual cell ID.

From each TRP of multi-TRP, a different code word (CW) and a different layer may be transmitted. As one form of multi-TRP transmission, non-coherent joint transmission (NCJT) has been under study.

In NCJT, for example, TRP 1 subjects the first code word to modulation mapping and then layer mapping so as to transmit the first PDSCH by using a first number of layers (for example, two layers) by means of first precoding. Further, TRP 2 subjects the second code word to modulation mapping and then layer mapping so as to transmit the second PDSCH by using a second number of layers (for example, two layers) by means of second precoding. These first PDSCH and second PDSCH may be assumed not to have a quasi-co-location (QCL) relationship (not quasi-co-located).

Note that it may be defined that a plurality of PDSCHs to be subjected to NCJT partially or entirely overlap regarding at least one of the time and frequency domains. In other words, at least one of the time and frequency resources of the first PDSCH from the first TRP and the second PDSCH from the second TRP may overlap.

(Path Loss Reference RS)

A path loss reference RS (a pathloss reference reference signal (RS), an RS for path loss reference, an RS for path loss measurement) is used for calculation of path loss for the PUSCH/PUCCH/SRS. In Rel. 15 NR, the maximum number of path loss reference RSs is four. In other words, the UE does not expect to simultaneously hold more than four path loss reference RSs per serving cell for all of the PUSCH/PUCCH/SRS transmission.

(Transmission Power Control)

<Transmission Power Control for PUSCH>

In NR, transmission power of the PUSCH is controlled based on a TPC command (also referred to as a value, an increased or decreased value, a correction value, or the like) that is indicated by a value of a certain field (also referred to as a TPC command field or the like) in the DCI.

For example, when the UE transmits the PUSCH on an active UL BWP b of a carrier f of a serving cell c by using a parameter set (open loop parameter set) having an index j and an index l of a power control adjustment state, transmission power ($P_{PUSC, Hb,f,c}(i, j, q_d, l)$) of the PUSCH in a PUSCH transmission occasion (also referred to as a transmission period or the like) i may be expressed as in expression (1) below.

Here, whether the power control adjustment state has a plurality of states (for example, two states) or a single state may be configured by using a higher layer parameter. Further, when a plurality of power control adjustment states are configured, one of the plurality of power control adjustment states may be identified with the index l (for example, $l \in \{0, 1\}$). The power control adjustment state may be referred to as a PUSCH power control adjustment state, a first or second state, or the like.

Further, the PUSCH transmission occasion i is a certain period in which the PUSCH is transmitted, and may include, for example, one or more symbols, one or more slots, or the like.

[Math. 1]

$$P_{PUSCH,b,f,c}(i, j, q_d, l) = \min\left\{\begin{array}{l}P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c} + f_{b,f,c}(i, l)\end{array}\right\}$$ Expression (1)

In expression (1), $P_{CMA,f,c}(i)$ is, for example, transmission power of the user terminal configured for the carrier f of the serving cell c in the transmission occasion i (also referred to as maximum transmission power, UE maximum output power, or the like). $P_{O\_PUSCH,b,f,c}(j)$ is, for example, a parameter related to target received power that is configured for the active UL BWP b of the carrier f of the serving cell c in a parameter set configuration j (for example, also referred to as a parameter related to a transmission power offset, a transmission power offset P0, a target received power parameter, or the like).

$M^{PUSCH}_{RB,b,f,c}(i)$ is, for example, the number of resource blocks (bandwidth) allocated for the PUSCH for the transmission occasion i in the active UL BWP b of the carrier f of the serving cell c and a subcarrier spacing μ. $\alpha_{b,f,c}(j)$ is a value provided by using a higher layer parameter (for example, also referred to as msg3-Alpha, p0-PUSCH-Alpha, a fractional factor, or the like).

$PL_{b,f,c}((q_d)$ is, for example, path loss (path loss compensation) that is calculated in the user terminal by using an index $q_d$ of a reference signal (path loss reference RS, DL RS for path loss measurement, PUSCH-PathlossReferenceRS) for the downlink BWP associated with the active UL BWP b of the carrier f of the serving cell c.

$\Delta_{TF,b,f,c}(i)$ is a transmission power adjustment component (offset, transmission format compensation) for the UL BWP b of the carrier f of the serving cell c.

$f_{b,f,c}(i, l)$ is a value based on a TPC command of the power control adjustment state index l of the active UL BWP of the carrier f of the serving cell c and the transmission occasion i (for example, a power control adjustment state, an accumulated value of the TPC commands, or a value by a closed loop). For example, $f_{b,f,c}(i, l)$ may be expressed as in expression (2). l may be referred to as a closed loop index.

[Math. 2]

$$f_{b,f,c}(i,l) = f_{b,f,c}(i_{last},l) + \delta_{PUSCH,b,f,c}(i_{last},i,K_{PUSCH},l)$$ Expression (2)

In expression (2), $\delta_{PUSCH,b,f,c}(i_{last}, i, K_{PUSCH}, l)$ may be, for example, a TPC command indicated by a TPC command field value in DCI (for example, DCI format 0_0 or 0_1) that is detected in the active UL BWP b of the carrier f of the serving cell c for the transmission occasion i after an immediately preceding transmission occasion $i_{last}$ of the PUSCH, or may be a TPC command indicated by a TPC command field value in DCI (for example, DCI format 2_2) that includes CRC parity bits scrambled with a specific RNTI (Radio Network Temporary Identifier) (for example, a TPC-PUSCH-RNTI) (that is subjected to CRC scramble).

When the UE is not provided with a path loss reference RS (for example, PUSCH-PathlossReferenceRS) or when the UE is not provided with a dedicated higher layer parameter, the UE may calculate $PL_{b,f,c}(q_d)$ by using RS resources from the SSB used to obtain the Master Information Block (MIB).

When RS resource indexes of the number up to the value of the maximum number of the path loss reference RS (for example, maxNrofPUSCH-PathlossReferenceRS) and a set of RS configurations for the respective RS resource indexes by the path loss reference RS are configured for the UE, the set of RS resource indexes may include either one or both of a set of SS/PBCH block indexes and a set of CSI-RS resource indexes. The UE may identify the RS resource index $q_d$ in the set of RS resource indexes.

When PUSCH transmission is scheduled by using a Random Access Response (PAR) UL grant, the UE may use the same RS resource index $q_d$ as that for corresponding PRACH transmission.

When the UE is provided with configuration of power control of the PUSCH by the SRI (for example, SRI-PUSCH-PowerControl) and when the UE is provided with one or more values of the ID of the path loss reference RS, the UE may obtain mapping between a set of values for an SRI field in DCI format 0_1 and a set of ID values of the path loss reference RS from higher layer signaling (for example, sri-PUSCH-PowerControl-Id in SRI-PUSCH-PowerControl). The UE may determine the RS resource index $q_d$, based on the ID of the path loss reference RS mapped to an SRI field value in DCI format 0_1 for scheduling the PUSCH.

When PUSCH transmission is scheduled by using DCI format 0_0, and the UE is not provided with the PUCCH spatial relation information regarding the PUCCH resource having the lowest index for the active UL BWP b of each carrier f and the serving cell c, the UE may use the same RS resource index $q_d$ as that for PUCCH transmission in the PUCCH resource.

When PUSCH transmission is scheduled by using DCI format 0_0, and the UE is not provided with space setting of PUCCH transmission, or PUSCH transmission is scheduled by using DCI format 0_1 not including the SRI field, or configuration of power control of the PUSCH by the SRI is not provided for the UE, the UE may use the RS resource index $q_d$ including the ID of the path loss reference RS of zero.

When configured grant configuration (for example, ConfiguredGrantConfig) includes a certain parameter (for example, rrc-CofiguredUplinkGrant) regarding PUSCH transmission that is configured by the configured grant configuration, the RS resource index $q_d$ may be provided for the UE by using a path loss reference index (for example, pathlossReferenceIndex) in the certain parameter.

When configured grant configuration does not include a certain parameter regarding PUSCH transmission that is configured by the configured grant configuration, the UE may determine the RS resource index $q_d$, based on the value of the ID of the path loss reference RS that is mapped to the SRI field in a DCI format for activating the PUSCH transmission. When the DCI format does not include the SRI field, the UE may determine the RS resource index $q_d$ including the ID of the path loss reference RS of zero.

Note that expressions (1) and (2) are merely examples, and these are not restrictive. It is only necessary that the user terminal control transmission power of the PUSCH, based on at least one parameter shown in expressions (1) and (2), and an additional parameter may be included, or a part of the parameters may be omitted. Further, in expressions (1) and (2) shown above, transmission power of the PUSCH is controlled for each active UL BWP of a certain carrier of a certain serving cell, but this is not restrictive. At least a part of the serving cell, the carrier, the BWP, and the power control adjustment state may be omitted.

<Transmission Power Control for PUCCH>

Further, in NR, transmission power of the PUCCH is controlled based on a TPC command (also referred to as a value, an increased or decreased value, a correction value, an indication value, or the like) indicated by a value of a certain field (also referred to as a TPC command field, a first field, or the like) in DCI.

For example, by using the index l of the power control adjustment state, transmission power ($P_{PUCCH, b,f,c}(i, q_u, q_d, l)$) of the PUCCH in a PUCCH transmission occasion (also referred to as a transmission period or the like) i regarding the active UL BWP b of the carrier f of the serving cell c may be expressed as in expression (3) below.

The power control adjustment state may be referred to as a PUCCH power control adjustment state, a first or second state, or the like.

Further, the PUCCH transmission occasion i is a certain period in which the PUCCH is transmitted, and may include, for example, one or more symbols, one or more slots, or the like.

In expression (4), $\delta_{PUCCH,b,f,c}(i_{last}, i, K_{PUCCH}, l)$ may be, for example, a TPC command indicated by a TPC command field value in DCI (for example, DCI format 1_0 or 1_1) that is detected in the active UL BWP b of the carrier f of the serving cell c for the transmission occasion i after an immediately preceding transmission occasion $i_{last}$ of the PUCCH, or may be a TPC command indicated by a TPC command field value in DCI (for example, DCI format 2_2) that includes CRC parity bits scrambled with a specific Radio Network Temporary Identifier (RNTI) (for example, a TPC-PUCCH-RNTI) (that is subjected to CRC scramble).

If the UE is provided with information indicating use of two PUCCH power control adjustment states (twoPUCCH-PC-AdjustmentStates) and the PUCCH spatial relation information (PUCCH-SpatialRelationInfo), l may be {0, 1}, whereas if the UE is not provided with the information indicating use of two power control adjustment states for the PUCCH or the spatial relation information for the PUCCH, l may be 0.

If the UE obtains the TPC command value from DCI format 1_0 or 1_1, and the UE is provided with the PUCCH spatial relation information, the UE may obtain mapping

[Math. 3]

Expression (3)

$$P_{PUCCH,b,f,c}(i, q_u, q_d, l) = \min\left\{ \begin{array}{l} P_{CMAX,f,c}(i), \\ P_{O\_PUCCH,b,f,c}(q_u) + 10\log_{10}\left(2^\mu \cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i, l) \end{array} \right\}$$

In expression (3), $P_{CMAX,f,c}(i)$ is, for example, transmission power of the user terminal configured for the carrier f of the serving cell c in the transmission occasion i (also referred to as maximum transmission power, UE maximum output power, or the like). $P_{O\_PUCCH,b,f,c}(q_u)$ is, for example, a parameter related to target received power that is configured for the active UL BWP b of the carrier f of the serving cell c in the transmission occasion i (for example, also referred to as a parameter related to a transmission power offset, a transmission power offset PC, a target received power parameter, or the like).

$M^{PUCCH}_{RB,b,f,c}(i)$ is, for example, the number of resource blocks (bandwidth) allocated for the PUCCH for the transmission occasion i in the active UL BWP b of the carrier f of the serving cell c and the subcarrier spacing p. $PL_{b,f,c}(q_d)$ is, for example, path loss that is calculated in the user terminal by using the index $q_d$ of the reference signal (path loss reference RS, DL RS for path loss measurement, PUCCH-PathlossReferenceRS) for the downlink BWP associated with the active UL BWP b of the carrier f of the serving cell c.

$\Delta_{F\_PUCCH}(F)$ is a higher layer parameter given for each PUCCH format. $\Delta_{TF,b,f,c}(i)$ is a transmission power adjustment component (offset) for the UL BWP b of the carrier f of the serving cell c.

$g_{b,f,c}(i, l)$ is a value based on a TPC command of the power control adjustment state index l of the active UL BWP of the carrier f of the serving cell c and the transmission occasion i (for example, a power control adjustment state, an accumulated value of the TPC commands, a value by a closed loop, or a PUCCH power adjustment state). For example, $g_{b,f,c}(i, l)$ may be expressed as in expression (4).

[Math. 4]

$$g_{b,f,c}(i,l) = g_{b,f,c}(i_{last}, l) + \delta_{PUCCH,b,f,c}(i_{last}, i, K_{PUCCH}, l) \quad \text{Expression (4)}$$

between the PUCCH spatial relation information ID (pucch-SpatialRelationInfoId) value and the closed loop index (closedLoopIndex, power adjustment state index l) by using an index provided by a P0 ID for the PUCCH (p0-PUCCH-Id in p0-Set in PUCCH-PowerControl in PUCCH-Config). When the UE receives an activation command including the value of the PUCCH spatial relation information ID, the UE may determine the value of the closed loop index for providing the value of l through a link for a corresponding P0 ID for the PUCCH.

If the UE is provided with configuration of a $P_{O\_PUCCH,b,f,c}(q_u)$ value for a corresponding PUCCH power adjustment state l regarding the active UL BWP b of the carrier f of the serving cell c from a higher layer, $g_{b,f,c}(i, l)=0$ and k=0, 1, ..., i. If the UE is provided with the PUCCH spatial relation information, the UE may determine the value of l from the value of $q_u$, based on the PUCCH spatial relation information that is associated with the P0 ID for the PUCCH corresponding to $q_u$ and the closed loop index value corresponding to l.

$q_u$ may be the P0 ID for PUCCH (p0-PUCCH-Id) that indicates P0 for the PUCCH (P0-PUCCH) in a P0 set for the PUCCH (p0-Set).

Note that expressions (3) and (4) are merely examples, and these are not restrictive. It is only necessary that the user terminal control transmission power of the PUCCH, based on at least one parameter shown in expressions (3) and (4), and an additional parameter may be included, or a part of the parameters may be omitted. Further, in expressions (3) and (4) shown above, transmission power of the PUCCH is controlled for each active UL BWP of a certain carrier of a certain serving cell, but this is not restrictive. At least a part of the serving cell, the carrier, the BWP, and the power control adjustment state may be omitted.

<Transmission Power Control for SRS>

For example, by using the index l of the power control adjustment state, transmission power ($P_{SRS,b,f,c}(i, q_s, l)$) of the SRS in an SRS transmission occasion (also referred to as a transmission period or the like) i regarding the active UL BWP b of the carrier f of the serving cell c may be expressed as in expression (5) below.

The power control adjustment state may be referred to as an SRS power control adjustment state, a value based on a TPC command, an accumulated value of the TPC commands, a value by a closed loop, a first or second state, or the like. l may be referred to as a closed loop index.

Further, the SRS transmission occasion i is a certain period in which the SRS is transmitted, and may include, for example, one or more symbols, one or more slots, or the like.

[Math. 5]

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{array} \right\}$$

Expression (5)

In expression (5), $P_{CMAX,f,c}(i)$ is, for example, UE maximum output power for the carrier f of the serving cell c in the SRS transmission occasion i. $P_{O\_SRS,b,f,c}(q_s)$ is a parameter related to target received power that is provided by p0 for the active UL BWP b of the carrier f of the serving cell c and an SRS resource set $q_s$ (provided by SRS-ResourceSet and SRS-ResourceSetId) (for example, also referred to as a parameter related to a transmission power offset, a transmission power offset PC, a target received power parameter, or the like).

$M_{SRS,b,f,c}(i)$ is an SRS bandwidth represented by the number of resource blocks for the SRS transmission occasion i on the active UL BWP b of the carrier f of the serving cell c and the subcarrier spacing p.

$\alpha_{SRS,b,f,c}(q_s)$ is provided by a (for example, alpha) for the active UL BWP b of the carrier f of the serving cell c and the subcarrier spacing p and for the SRS resource set $q_s$.

$PL_{b,f,c}(q_d)$ is a DL path loss estimation value [dB] that is calculated by the UE by using the RS resource index $q_d$ for the active DL BWP of the serving cell c and the SRS resource set $q_s$. The RS resource index $q_d$ is a path loss reference RS that is associated with the SRS resource set $q_s$ (DL RS for path loss measurement, for example, provided by pathlossReferenceRS), and is the SS/PBCH block index (for example, ssb-Index) or the CSI-RS resource index (for example, csi-RS-Index).

$h_{b,f,c}(i, l)$ is an SRS power control adjustment state for the active UL BWP of the carrier f of the serving cell c and for the SRS transmission occasion i. When configuration of the SRS power control adjustment state (for example, srs-PowerControlAdjustmentStates) indicates the same power control adjustment state for SRS transmission and PUSCH transmission, it is the current PUSCH power control adjustment state $f_{b,f,c}(i, l)$. On the other hand, when the configuration of the SRS power control adjustment state indicates independent power control adjustment states for SRS transmission and PUSCH transmission and configuration of TPC accumulation is not provided, the SRS power control adjustment state $h_{b,f,c}(i)$ may be expressed as in expression (6).

[Math. 6]

$$h_{b,f,c}(i) = h_{b,f,c}(i-1) + \sum_{m=0}^{o(S_i)-1} \delta_{SRS,b,f,c}(m)$$

Expression (6)

In expression (6), $b_{SRS,b,f,c}(m)$ is coded with another TPC command in the PDCCH having DCI (for example, DCI format 2_3). $\Sigma\delta_{SRS,b,f,c}(m)$ is the sum of the TPC commands in the set $S_i$ of TPC command values having cardinality c ($S_i$), which is received by the UE between $K_{SRS}(i-i_0)-1$ symbols before an SRS transmission occasion i-$i_0$ and $K_{SRS}(i)$ symbols before the SRS transmission occasion i in the active UL BWP b of the carrier f of the serving cell c and the subcarrier spacing p. Here, $i_0 > 0$ is a minimum integer that causes $K_{SRS}(i-i_0)-1$ symbols before the SRS transmission occasion i-$i_0$ to be earlier than $K_{SRS}(i)$ symbols before the SRS transmission occasion i.

Note that expressions (5) and (6) are merely examples, and these are not restrictive. It is only necessary that the user terminal control transmission power of the SRS, based on at least one parameter shown in expressions (5) and (6), and an additional parameter may be included, or a part of the parameters may be omitted. Further, in expressions (5) and (6) shown above, transmission power of the SRS is controlled for each BWP of a certain carrier of a certain cell, but this is not restrictive. At least a part of the cell, the carrier, the BWP, and the power control adjustment state may be omitted.

(Indication of Power Control Configuration)

In Rel. 15 NR, in order to keep up with changes of spatial relation, switch between a plurality of states of an open loop (OL)-TPC or a closed loop (CL)-TPC is possible with the SRI field in DCI. If the usage of the SRS resource set is codebook transmission (codebook), the maximum number of the SRI field value is 2 (the SRI field length is 1 bit), whereas if the usage of the SRS resource set is non-codebook transmission (nonCodebook), the maximum number of the SRI field value is 4 (the SRI field length is 2 bits).

In order to configure the power control configuration for the PUSCH, a list (sri-PUSCH-MappingToAddModList) of power control configurations (SRI-PUSCH-PowerControl) mapped to the SRI field value is included in PUSCH power control information (PUSCH-PowerControl) in PUSCH configuration information (PUSCH-Config). The power control configuration includes a power control configuration ID corresponding to the SRI field value (sri-PUSCH-PowerControlId), a path loss reference RS ID indicating the path loss reference RS (sri-PUSCH-PathlossReferenceRS-Id), a P0-α set ID indicating a set of P0 and α (sri-P0-PUSCH-AlphaSetId), and a closed loop (CL) ID corresponding to the power control state 1 (sri-PUSCH-ClosedLoopIndex).

At least one of the path loss reference RS ID, the P0-a set ID, and the closed loop ID may be referred to as a power control (transmission power control, TPC) parameter. At least one of the path loss reference RS ID and the P0-a set ID is used for open loop (OL) power control, and may thus be referred to as an OL power control (TPC) parameter. The closed loop ID is used for closed loop (CL) power control, and may thus be referred to as a CL power control (TPC) parameter.

For example, power control configuration #0 including P0 #0, α #0, path loss reference RS #0, and power control adjustment state #0 (l=0) may be associated with SRI field value 0, and power control configuration #1 including P0 #1, α #1, path loss reference RS #1, and power control adjustment state #1 (l=1) may be associated with SRI field value 1. For the UE, the associated power control configuration is indicated by the SRI field.

When only one SRS resource is configured for the UE, the SRI field length is 0 bits.

In order to configure the power control configuration for the PUCCH, the power control configuration (PUCCH-PowerControl) is included in the PUCCH configuration information (PUCCH-Config). The power control configuration includes a correction value $\Delta_{F\_PUCCH}(F)$ for each PUCCH format (deltaF-PUCCH-f0, deltaF-PUCCH-f1, deltaF-PUCCH-f2, deltaF-PUCCH-f3, deltaF-PUCCH-f4), a set of P0 (p0-Set), a set of path loss reference RSs (pathlossReferenceRSs), and information indicating whether or not two PUCCH power adjustment states are used (two-PUCCH-PC-AdjustmentStates). The path loss reference RS may be represented by the SSB index (SSB-Index) or the CSI-RS (NZP-CSI-RS resource ID (NZP-CSI-RS-ResourceId)).

In this manner, in Rel. 15 NR, the power control configuration can be switched.

(Spatial Relation between Reference RS and Target RS)

The UE may receive, from a network (an NW, for example, a gNB), newly defined information related to spatial relation (or configuration of QCL) between the reference RS and the target RS.

The UE may determine a UL beam to be used by the UE, based on the newly defined information related to spatial relation between the reference RS and the target RS.

For example, the UE receives, from the NW, newly defined information related to spatial relation (TCI state) between the reference RS and the target RS.

Subsequently, the UE determines a UL beam to be used by the UE, based on the newly defined information related to spatial relation (TCI state) between the reference RS and the target RS, and performs UL transmission for the NW.

In the present disclosure, the newly defined information related to spatial relation between the reference RS and the target RS may be interchangeably interpreted as information related to the UL TCI state, information related to the TCI state made common to the DL and the UL, or the like.

Here, as a new framework of the UL TCI, a method of reporting the newly defined information related to spatial relation (or configuration of QCL) between the reference RS and the target RS to the UE will be described. Further, as a new framework of the UL TCI, application of the information related to spatial relation between the reference RS and the target RS will be described.

The UE may receive newly defined information related to spatial relation (for example, the UL TCI state) between the reference RS and the target RS. For example, the UE receives, from the NW, newly defined information related to spatial relation (for example, the UL TCI state) between the reference RS and the target RS.

Subsequently, the UE determines a UL beam to be used by the UE, based on the newly defined information related to spatial relation (for example, the UL TCI state) between the reference RS and the target RS, and performs UL transmission for the NW.

The UE may receive the newly defined information related to spatial relation (for example, the UL TCI state) between the reference RS and the target RS by using at least one of higher layer signaling and physical layer signaling. Further, the UE may receive the information by using a combination of higher layer signaling and physical layer signaling.

The newly defined information related to spatial relation between the reference RS and the target RS may be, for example, specific information (for example, spatialRelationInfo-r17) of an RRC information element. The reference RS may be, for example, at least one of the SSB, the CSI-RS, and the SRS. The target RS may be, for example, the UL RS (for example, at least one of the DMRS for demodulating at least one of the PUCCH and the PUSCH, the PRACH, and the SRS).

In the specific information (for example, spatialRelationInfo-r17) element, indexes (IDs, for example, SpatialRelationInfoId) related to a certain number of (for example, X (X is an integer of 0 or greater)) pieces of specific information may be configured. In the indexes related to a certain number of (for example, X) pieces of specific information, a subset of a certain number of (for example, X) pieces of information related to spatial relation may be configured for each target RS (for example, at least one of the SRS, PUCCH-Config, PUSCH-Config, and the PRACH).

For the UE, candidates (list) of the newly defined information related to spatial relation between the reference RS and the target RS may be configured by using RRC signaling, and information related to spatial relation for a certain channel/RS (for example, the SRS, the PUCCH, or the PUSCH) may be activated/deactivated by using the MAC CE.

Further, for the UE, candidates (list) of the newly defined information related to spatial relation between the reference RS and the target RS may be configured by using RRC signaling, and information related to spatial relation for a certain channel/RS (for example, the aperiodic SRS, the PUSCH, the PRACH (for example, the PRACH indicated by the PDCCH for transmitting a DCI format including a new field), and the PUCCH (for example, the PUCCH indicated by a new field in DL assignment)) may be dynamically indicated by using L1 signaling (for example, downlink control information (DCI)).

The UE may receive information related to spatial relation (UL TCI state) applied to a specific channel/RS by using physical layer signaling (L1 signaling). Information related to resources (for example, resource IDs) is configured (indicated) for the specific channel/RS. Different spatial relation may be configured for each of the configured (indicated) resources. In other words, the UE may assume that different spatial relation (UL TCI state) is configured for each of the resources configured for the specific channel/RS.

For example, the information (for example, spatialRelationInfo-r17) related to spatial relation between the reference RS and the target RS may be the information element related to spatial relation between the reference RS and the target RS as shown in FIG. 3A. In the information element of spatialRelationInfo-r17, indexes (SpatialRelationInfoId) related to a certain number of (for example, X) pieces of specific information may be configured.

Further, as shown in FIG. 3B, in the information element (for example, spatialRelationInfo-r17) related to spatial relation between the reference RS and the target RS, information related to a panel (for example, an ID or an index (panelIndex)) may be configured. The information related to the panel may be at least one of information related to a UE antenna group (UE antenna group ID), information related to a specific RS group (specific RS group ID), and another similar ID.

The newly defined information (for example, spatialRelationInfo-r17) related to spatial relation between the reference RS and the target RS may be applied to a certain UL channel/RS. For example, the newly defined information (for example, spatialRelationInfo-r17) related to spatial relation between the reference RS and the target RS may be applied to all of the UL channels/RSs. In other words, for the UE, only the newly defined information (for example, spatialRelationInfo-r17) related to spatial relation between the reference RS and the target RS may be configured instead of the existing spatial relation.

Further, for example, the newly defined information (for example, spatialRelationInfo-r17) related to spatial relation between the reference RS and the target RS may be applied to some of the UL channels/RSs, and information related to the existing spatial relation may be applied to the rest of the UL channels/RSs.

In this case, the newly defined information (for example, spatialRelationInfo-r17) related to spatial relation between the reference RS and the target RS and the information related to the existing spatial relation for different UL channels/RSs may be configured together for the UE. In this case, one piece of information related to spatial relation may be applied to one UL channel/RS by using higher layer signaling (for example, RRC configuration/reconfiguration).

Further, in this case, when one piece of newly defined information (for example, spatialRelationInfo-r17) related to spatial relation between the reference RS and the target RS or the information related to the existing spatial relation is configured for one UL channel/RS, different spatial relations may be applied in the RRC reconfiguration.

A study of how the UE determines parameters related to UL transmission power control in consideration of the UL TCI state, the spatial relation information, and the like scheduled to be adopted in future radio communication systems has not yet been under development. Unless the parameters related to the UL transmission power control are appropriately determined, communication throughput may be deteriorated.

In the light of this, the inventors of the present invention came up with the idea of a method for enabling appropriate determination of the parameters related to UL transmission power control.

Embodiments according to the present disclosure will be described in detail below with reference to the drawings. A radio communication method according to each embodiment and each aspect may be individually applied, or may be applied in combination.

The TCI state may be interpreted as a TCI state or QCL assumption, QCL assumption, a spatial domain reception filter, a UE spatial domain reception filter, a spatial domain filter, a UE receive beam, a DL receive beam, a DL-RS, or the like. The RS of QCL type D, the DL-RS associated with QCL type D, the DL-RS having QCL type D, a source of the DL-RS, the SSB, and the CSI-RS may be interchangeably interpreted as each other.

In the present disclosure, the TCI state may be information (for example, the DL-RS, the QCL type, a cell in which the DL-RS is transmitted, or the like) related to a receive beam (spatial domain reception filter) that is indicated (configured) for the UE. The QCL assumption may be information (for example, the DL-RS, the QCL type, a cell in which the DL-RS is transmitted, or the like) related to a receive beam (spatial domain reception filter) that is assumed by the UE, based on transmission or reception of an associated signal (for example, the PRACH).

In the present disclosure, the UL TCI state may be interchangeably interpreted as a transmit beam of the UE, a UL beam, spatial relation of the UL TCI state, spatial relation, or the like. The UL beam may mean a transmit beam of the PUCCH/PUSCH. The "UL TCI," the "ULTCI," and the "UL-TCI" may be interchangeably interpreted as each other.

In the present disclosure, a TRP, a panel, a TRP ID, a panel ID, a CORESET group ID for a CORESET of the PDCCH from the TRP or the panel, a CORESET pool index indicating a CORESET pool of the PDCCH from the TRP or the panel, a CORESET ID indicating a CORESET of the PDCCH from the TRP or the panel, and another index (a DMRS port group ID or the like) corresponding to the TRP or the panel may be interchangeably interpreted as each other.

In the present disclosure, the SRS may be interpreted as at least one of an aperiodic SRS (A-SRS), a periodic SRS (P-SRS), and a semi-persistent (SP-SRS).

In the present disclosure, "relation" may be interchangeably interpreted as "mapping." The term "rXX" (for example, r17) in the present disclosure represents a release number of 3GPP (for example, 3GPP Rel. 17). However, the term may be replaced with a term corresponding to another release number (for example, r18, r19, r20, or the like).

(Radio Communication Method)
<PUCCH Power Control according to Rel. 16>

FIG. 4 is a diagram to show PUCCH spatial relation information according to Rel. 16. As shown in FIG. 4, the PUCCH spatial relation information (PUCCH-SpatialRelationInfo-r16) is configured as an RRC parameter. In the PUCCH spatial relation information (PUCCH-SpatialRelationInfo-r16), an ID of a PUCCH path loss reference RS (pucch-PathlossReferenceRS-Id-r16), an ID of a transmission power offset P0 for the PUCCH (p0-PUCCH-Id-r16), and a closed loop index (closedLoopIndex-r16) are included. These are used for power control of the PUCCH.

FIG. 5 is a diagram to show PUCCH power control information according to Rel. 16. As shown in FIG. 5, the PUCCH power control information (PUCCH-PowerControl) includes a P0 set indicating a P0-PUCCH (p0-Set) and path loss reference RSs (pathlossReferenceRSs).

Further, the P0-PUCCH includes an ID of the P0-PUCCH (p0-PUCCH-Id) and a value of the P0-PUCCH (p0-PUCCH-Value). Specifically, relation between P0-PUCCH-ID and the value of the P0-PUCCH is indicated by the PUCCH power control information.

Further, each PUCCH path loss reference RS (PUCCH-PathlossReferenceRS) includes a PUCCH path loss reference RS-ID (pucch-PathlossReferenceRS-Id) and a downlink reference signal used for PUCCH path loss estimation (referenceSignal, the SSB or the CSI-RS). Specifically, relation between the PUCCH path loss reference RS-ID and the downlink reference signal is indicated by the PUCCH power control information.

Embodiment 1

In Embodiment 1, a configuration of the power control information of the PUCCH in a framework of a unified UL TCI (unified TCI, UL TCI) will be described. The UE receives specific information indicating relation (mapping) between an identifier (ID) of the spatial relation information and a parameter related to PUCCH transmission power control (PUCCH path loss reference RS/P0-PUCCH/closed loop index) by using higher layer signaling (for example, RRC). The UE determines a parameter related to PUCCH transmission power, based on mapping between the spatial relation information and the parameter related to PUCCH transmission power control, and determines PUCCH transmission power. The UE controls transmission of the PUCCH, based on the determined PUCCH transmission power.

The "PUCCH path loss reference RS" according to Embodiment 1 corresponds to $q_d$ in expression (3). The "P0-PUCCH" corresponds to $P_{O\_PUCCH,b,f,c}(q_u)$ in expression (3). The "closed loop index" corresponds to 1 in expressions (3) and (4).

In the present disclosure, the "PUCCH path loss reference RS" and the "PUCCH path loss reference RS-ID" may be interchangeably interpreted as each other. The "P0-PUCCH" and the "P0-PUCCH-ID" may be interchangeably interpreted as each other. The "PUCCH-closed loop index" and the "closed loop index" may be interchangeably interpreted as each other.

[Aspect 1-1]

The UE may receive specific information indicating mapping between the PUCCH spatial relation information (the identifier (ID) of the PUCCH spatial relation information) and the parameter related to PUCCH transmission power control (PUCCH path loss reference RS/P0-PUCCH/closed loop index) by using higher layer signaling (for example, RRC). The specific information may include the identifier of the PUCCH spatial relation information and the parameter related to PUCCH transmission power control. The specific information may be a PUCCH power control information element (PUCCH-PowerControl information element), or may be a new information element that does not include a reference signal used for spatial relation, unlike the PUCCH power control information element.

FIG. 6 is a diagram to show an example of the PUCCH power control information element according to aspect 1-1. As shown in FIG. 6, the PUCCH power control information (PUCCH-PowerControl-r17) being an RRC parameter includes UL-TCI-PUCCH mapping (ULTCI-PUCCH-mapping-r17) corresponding to ULTCI-PUCCH power control information (ULTCI-PUCCH-PowerControl-r17).

The ULTCI-PUCCH power control information (ULTCI-PUCCH-PowerControl-r17) includes a PUCCH spatial relation information ID (spatialRelationInfoId-r17), a PUCCH path loss reference RS-ID (pucch-PathlossReferenceRS-Id), a P0-PUCCH-ID (p0-PUCCH-Id), and a PUCCH-closed loop index (pucch-closedLoopIndex). Specifically, in the PUCCH power control information element, mapping between the PUCCH spatial relation information and the PUCCH path loss reference RS/P0-PUCCH/closed loop index is indicated.

FIG. 7 is a diagram to show an example of a ULTCI-PUCCH mapping configuration information element according to aspect 1-1. The ULTCI-PUCCH mapping configuration information element is an example of a new information element not including a reference signal used for spatial relation, unlike the PUCCH power control information element. As shown in FIG. 7, ULTCI-PUCCH mapping information (ULTCI-PUCCH-mapping-r17) corresponds to ULTCI-PUCCH power control information (ULTCI-PUCCH-PowerControl-r17). Information included in the ULTCI-PUCCH power control information (ULTCI-PUCCH-PowerControl-r17) is similar to the example shown in FIG. 6.

The PUCCH spatial relation information ID (spatialRelationInfoId-r17) may indicate a unified (UL) spatial relation configuration that is used for configuration of spatial relation between a reference RS (for example, the SSB/CSI-RS/SRS) and a target UL channel/RS (for example, the PUCCH/PUSCH/SRS/UL DMRS). The PUCCH spatial relation information ID (spatialRelationInfoId-r17) may be regarded as a UL-TCI state configuration.

[Aspect 1-2]

The UE may receive specific information (spatial relation information) indicating mapping between the identifier (ID) of the spatial relation information and the parameter related to PUCCH transmission power control (PUCCH path loss reference RS/P0-PUCCH/closed loop index) by using higher layer signaling (for example, RRC). The spatial relation information may include the identifier of the spatial relation information and the PUCCH path loss reference RS-ID/P0-PUCCH-ID/PUCCH-closed loop index. The specific information (spatial relation information) according to aspect 1-2 includes, for example, information (pucch-PathlossReferenceRS-Config-r17) indicating a downlink reference signal (referenceSignal) used for spatial relation and a downlink reference signal used for path loss estimation (FIG. 9).

FIG. 8 is a diagram to show the first example of the spatial relation information according to aspect 1-2. As shown in FIG. 8, the spatial relation information (SpatialRelationInfo-r17) includes a spatial relation information ID (spatialRelationInfoId-r17), a PUCCH path loss reference RS-ID (pucch-PathlossReferenceRS-Id), a P0-PUCCH-ID (p0-PUCCH-Id), and a PUCCH-closed loop index (pucch-closedLoopIndex). Specifically, the spatial relation information indicates mapping between the spatial relation information ID and the parameter related to PUCCH transmission power control. Note that, similarly to the example shown in FIG. 5, the PUCCH power control information may indicate mapping between the ID of the P0-PUCCH and the value of the P0-PUCCH and mapping between the PUCCH path loss reference RS-ID and the reference signal.

FIG. 9 is a diagram to show the second example of the spatial relation information according to aspect 1-2. As shown in FIG. 9, the spatial relation information (SpatialRelationInfo-r17) includes a spatial relation information ID (SpatialRelationInfoId-r17), configuration information of the PUCCH path loss reference RS (pucch-PathlossReferenceRS-Config-r17), a value of the P0-PUCCH (p0-PUCCH-value), and a PUCCH-closed loop index (pucch-closedLoopIndex). Specifically, the spatial relation information indicates mapping between the spatial relation information ID and the parameter related to PUCCH transmission power control.

Note that the spatial relation information is used for the PUSCH/PUCCH/SRS, and a configured power control parameter (PUCCH path loss reference RS, P0-PUCCH, closed loop index) may be applied only to the PUCCH.

[Operation of UE]

In PUCCH power control according to Embodiment 1, when the spatial relation information is provided to (configured for) the UE, the UE may acquire mapping between the spatial relation information (spatial relation information ID) and the path loss reference RS/P0-PUCCH/closed loop index. When the spatial relation information ID is configured/indicated for the PUCCH resource, the UE may determine the PUCCH path loss reference RS/P0-PUCCH/closed loop index, based on the identified mapping. When the spatial relation information is not transmitted, the UE may apply PUCCH power control according to Rel. 16.

According to Embodiment 1, the UE can appropriately determine the parameter related to PUCCH transmission power, and can thus appropriately control PUCCH transmission power and prevent deterioration of communication throughput.

<PUSCH Power Control according to Rel. 16>

FIG. 10 is a diagram to show an example of a parameter related to power control of the PUSCH according to Rel. 16. As shown in FIG. 10, as an RRC parameter, PUSCH power control information (PUSCH-PowerControl) and SRI-PUSCH power control information (SRI-PUSCH-Power-Control) are configured. The SRI-PUSCH power information (SRI-PUSCH-PowerControl) includes an SRI-PUSCH power control ID (sri-PUSCH-PowerControlId), an SRI-PUSCH path loss reference RS-ID (sri-PUSCH-PathlossReferenceRS-Id), an SRI-P0-PUSCH-a set ID (sri-P0-PUSCH-AlphaSetId), and an SRI-PUSCH-closed loop index (sri-PUSCH-ClosedLoopIndex). Specifically, in the SRI-PUSCH power information, relation between the PUSCH power control ID and the PUSCH path loss reference RS-ID/P0-PUSCH-a set ID/PUSCH-closed loop index is indicated.

In the PUSCH power control, the UE determines the P0-PUSCH/a/path loss reference RS/closed loop index, based on mapping between the SRI indicated in the DCI for scheduling the UL and the P0-PUSCH/a/path loss reference RS/closed loop index by the RRC parameter. In a new unified framework, instead of the SRI, a new DCI field may be used for indication of spatial relation of the PUSCH. However, in such a case, how the parameter of PUSCH power control is determined presents a problem.

Embodiment 2

The UE receives DCI including specific information different from the SRI, and receives mapping between the specific information and a parameter related to uplink shared channel (PUSCH) transmission power control by using higher layer signaling. The UE determines the parameter used for PUSCH transmission power control, based on the specific information included in the DCI and the mapping. The specific information is, for example, new configuration information (ULTCI) or an identifier of the spatial relation information. The UE controls PUCCH transmission power by using the parameter used for PUSCH transmission power control.

The parameter related to PUSCH transmission power control is a PUSCH path loss reference RS/P0-PUSCH/a (Alpha)/closed loop index. The PUSCH path loss reference RS corresponds to $q_d$ in expression (1). The P0-PUSCH corresponds to $P_{O\_PUSCH,b,f,c}(j)$ in expression (1). $\alpha$ corresponds to $\alpha_{b,f,c}(j)$ in expression (1). The closed loop index corresponds to l in expression (1).

In the present disclosure, the "PUSCH path loss reference RS-ID" and the "PUSCH path loss reference RS" may be interchangeably interpreted as each other. The "P0-PUSCH-a set ID" and the "P0-PUSCH/a" may be interchangeably interpreted as each other. The "PUSCH-closed loop index" and the "closed loop index" may be interchangeably interpreted as each other.

[Aspect 2-1]

The UE receives DCI including ULTCI as specific information different from the SRI, and determines the parameter used for PUSCH transmission power control, based on the ULTCI and mapping by higher layer signaling. The mapping is assumed to be mapping between the SRI-PUSCH power control ID and the parameter related to PUSCH transmission power control, which is transmitted by using higher layer signaling (for example, RRC). It is assumed that the ULTCI in the DCI and the SRI-PUSCH power control ID in the higher layer signaling (RRC) correspond to each other.

Mapping between the SRI-PUSCH power control ID and the PUSCH path loss reference RS-ID/P0-PUSCH-α set ID/PUSCH-closed loop index may be configured as an RRC parameter in a manner similar to the PUSCH power control according to Rel. 16 described above. The configuration may indicate mapping between new indication in DCI (for example, ULTCI) and the PUSCH path loss reference RS-ID/P0-PUSCH-α set ID/PUSCH-closed loop index. Specifically, the new indication in DCI (for example, ULTCI) and the SRI-PUSCH power control ID may correspond to each other.

Further, the UE may determine the parameter used for PUSCH transmission power control (PUSCH path loss reference RS/P0-PUSCH/α/closed loop index), based on the new indication in DCI (for example, ULTCI) and the configured mapping. For example, if ULTCI=0, the UE may apply the PUSCH path loss reference RS/P0-PUSCH/a/closed loop index mapped to SRI-PUSCH power control ID=0.

When the UE receives the spatial relation information or the SRI-PUSCH power control information, the UE acquires mapping between the PUSCH path loss reference RS/P0-PUSCH/α/closed loop index and a code point of the ULTCI in the DCI. When the ULTCI is indicated in the DCI for scheduling the PUSCH, the UE determines the PUSCH path loss reference RS/P0-PUSCH/α/closed loop index mapped to the ULTCI as the parameter used for PUSCH transmission power control. When the spatial relation information is not transmitted, the UE may apply the PUSCH power control according to Rel. 16 described above.

[Aspect 2-2]

The UE receives DCI including the ULTCI as specific information different from the SRI, and determines the parameter used for PUSCH transmission power control, based on the ULTCI and mapping. The mapping is assumed to be mapping between the ULTCI-PUSCH power control ID and the parameter related to PUSCH transmission power control, which is transmitted by using higher layer signaling (RRC). It is assumed that the ULTCI in the DCI and the ULTCI-PUSCH power control ID in RRC correspond to each other.

In aspect 2-2, it is assumed that a new configuration by RRC indicating mapping between the ULTCI in the DCI and the PUSCH path loss reference RS-ID/P0-PUSCH-α set ID/closed loop index is applied.

FIG. 11 is a diagram to show an example of a parameter related to power control of the PUSCH according to aspect 2-2. ULTCI-PUSCH power information (ULTCI-PUSCH-PowerControl-r17) being an RRC parameter includes a ULTCI-PUSCH power control ID (ULTCI-PUSCH-Power-ControlId-r17), a ULTCI-PUSCH path loss reference RS-ID (ULTCI-PUSCH-PathlossReferenceRS-Id), a ULTCI-P0-PUSCH-α set ID (ULTCI-P0-PUSCH-AlphaSetId), and a ULTCI-PUSCH-closed loop index (ULTCI-PUSCH-ClosedLoopIndex). Specifically, in the ULTCI-PUSCH power information, mapping between the PUSCH power control ID and the PUSCH path loss reference RS-ID/P0-PUSCH-α set ID/closed loop index is indicated. The ULTCI in the DCI corresponds to the PUSCH power control ID.

The UE may determine the PUSCH path loss reference RS/P0-PUSCH/a/closed loop index, based on the ULTCI in the DCI and the configured mapping. For example, if ULTCI=0, the UE may apply the PUSCH path loss reference RS/P0-PUSCH/α/closed loop index mapped to ULTCI-PUSCH power control ID=0.

When the UE receives the spatial relation information or the ULTCI-PUSCH power information, the UE acquires mapping between the PUSCH path loss reference RS/P0-PUSCH/α/closed loop index and a code point of the ULTCI in the DCI. When the ULTCI is indicated in the DCI for scheduling the PUSCH, the UE determines the PUSCH path loss reference RS/P0-PUSCH/α/closed loop index mapped to the ULTCI as the parameter used for PUSCH transmission power control. When the spatial relation information is not transmitted, the UE may apply the PUSCH power control according to Rel. 16 described above.

[Aspect 2-3]

The UE receives DCI including an identifier of the spatial relation information (spatial relation information ID) as specific information, and determines the parameter used for PUSCH transmission power control, based on the spatial relation information ID and mapping transmitted by using higher layer signaling. The mapping is mapping between the spatial relation information ID and the parameter related to PUSCH transmission power control, which is transmitted by using higher layer signaling (RRC). It is assumed that the spatial relation information ID in the DCI and the spatial relation information ID in the higher layer signaling (RRC) correspond to each other.

Mapping between the spatial relation information ID and the parameter related to PUSCH transmission power control transmitted by using higher layer signaling may be included in a PUSCH power control information element (PUSCH-PowerControl information element), or may be included in a new information element different from the PUSCH power control information element. Each of the examples will be described below.

FIG. 12 is a diagram to show an example of the PUSCH power control information element according to aspect 2-3. As shown in FIG. 12, the PUSCH power control information (PUSCH-PowerControl-r17) being an RRC parameter includes ULTCI-PUSCH mapping (ULTCI-PUSCH-mapping-r17) corresponding to ULTCI-PUSCH power control information (ULTCI-PUSCH-PowerControl-r17).

The ULTCI-PUSCH power control information (ULTCI-PUSCH-PowerControl-r17) includes a spatial relation information ID (spatialRelationInfoId-r17), a PUSCH path loss reference RS-ID (PUSCH-PathlossReferenceRS-Id), a P0-PUSCH-α set ID (P0-PUSCH-AlphaSetId), and a PUSCH-closed loop index (PUSCH-ClosedLoopIndex). Specifically, in the PUSCH power control information element, mapping between the spatial relation information ID and the parameter used for PUSCH transmission power control (PUSCH path loss reference RS/P0-PUSCH/α/closed loop index) is indicated.

FIG. 13 is a diagram to show an example of a ULTCI-PUSCH mapping configuration information element according to aspect 2-3. The ULTCI-PUSCH mapping configuration information element is an example of a new information element different from the PUSCH power control information element. As shown in FIG. 13, the ULTCI-PUSCH mapping information (ULTCI-PUSCH-mapping-r17) corresponds to the ULTCI-PUSCH power control information (ULTCI-PUSCH-PowerControl-r17). Information included in the ULTCI-PUSCH power control information (ULTCI-PUSCH-PowerControl-r17) is similar to the example shown in FIG. 12.

When the UE receives the spatial relation information or the ULTCI-PUSCH power information, the UE acquires mapping between the PUSCH path loss reference RS/P0-PUSCH/α/closed loop index and the spatial relation information ID. When the spatial relation information ID is indicated in the DCI for scheduling the PUSCH, the UE determines the PUSCH path loss reference RS/P0-PUSCH/α/closed loop index mapped to the spatial relation information ID as the parameter used for PUSCH transmission power control. When the spatial relation information is not transmitted, the UE may apply the PUSCH power control method according to Rel. 16.

In aspect 2-3, the UE may support PUSCH transmission (for example, PUSCH transmission for multi-TRP according to Rel. 16) for single DCI (S-DCI, one piece of DCI indicating a plurality of TCI states)-based multi-TRP. For the UE, in order to support PUSCH transmission for the multi-TRP, the code point of the ULTCI in the DCI may be mapped to a plurality of pieces of spatial relation information (spatial relation information IDs). In aspect 2-3, the ULTCI code point in the DCI is easily mapped to a plurality of power control parameters.

According to Embodiment 2, the UE can appropriately determine the parameter related to PUSCH transmission power, and can thus appropriately control PUSCH transmission power and prevent deterioration of communication throughput.

<SRS Power Control according to Rel. 16>

FIG. 14 is a diagram to show an example of a parameter related to power control of the SRS according to Rel. 16. As shown in FIG. 14, the SRS resource set (SRS-ResourceSet) being an RRC parameter includes, as the parameter related to power control of SRS, an α (alpha), a P0, a path loss reference RS (pathlossReferenceRS), and an SRS power control adjustment state (srs-PowerControlAdjustmentStates). The SRS power control according to Rel. 16 is also applied to a new unified UL TCI framework.

The path loss reference RS of the UL channel/RS is related to QCL/TCI state/spatial relation of the UL channel/RS. In the unified UL TCI framework, the path loss reference RS is configured as a part of unified spatial relation. The path loss reference RS is applied to PUCCH/PUSCH/SRS power control.

Embodiment 3

The UE receives information indicating mapping between the identifier of the spatial relation information (spatial relation information ID) and a path loss reference reference signal (path loss reference RS) by using higher layer signaling, and determines the path loss reference RS used for transmission power control, based on the indicated spatial relation information ID and the mapping. The UE controls transmission power of the PUSCH/PUCCH/SRS by using the determined path loss reference RS.

In the present disclosure, the "spatial relation," the "spatial relation information," and the "spatial relation information ID" may be interchangeably interpreted as each other. The "path loss reference RS," a "path loss reference RSID," a "path loss reference signal (path loss RS)," a "path loss reference signal ID (path loss RSID)," and a "PL-RS" may be interchangeably interpreted as each other.

The path loss reference RS according to Embodiment 3 corresponds to $q_d$ in expressions (1), (3), and (5). Specifically, the path loss reference RS is a parameter used for PUCCH/PUSCH/SRS transmission power control.

[Aspect 3-1]

In aspect 3-1, information indicating mapping between the spatial relation information ID and the path loss reference reference signal (path loss reference RS) is included in the spatial relation information (SpatialRelationInfo-r17) of an RRC parameter. Specifically, the UE receives the spatial relation information including the information indicating the mapping.

FIG. 15A and FIG. 15B are each a diagram to show a configuration of the path loss reference RS according to aspect 3-1. FIG. 15A is a diagram to show path loss reference RS configuration information according to aspect 3-1. The path loss reference RS configuration information (ULTCI-PathlossReferenceRS-config-r17) being a new information element (RRC parameter) includes a path loss reference RSID (PathlossReferenceRS-Id-r17) corresponding to a path loss reference RS (PathlossReferenceRS-r17).

FIG. 15B is a diagram to show spatial relation information according to aspect 3-1. As shown in FIG. 15B, the spatial relation information being an RRC parameter includes a spatial relation information ID (spatialRelationInfoId-r17) and a path loss reference RSID (PathlossReferenceRS-Id-r17). Specifically, mapping between the spatial relation information (spatial relation information ID) and the path loss reference RS (path loss reference RSID) is indicated.

[Aspect 3-2]

In aspect 3-2, information indicating mapping between the spatial relation information ID and the path loss reference reference signal (path loss reference RS) is included in the spatial relation information (SpatialRelationInfo-r17) of an RRC parameter. Specifically, the UE receives the spatial relation information including the information indicating the mapping.

FIG. 16 is a diagram to show spatial relation information according to aspect 3-2. As shown in FIG. 16, the spatial relation information (SpatialRelationInfo-r17) being an RRC parameter includes a spatial relation information ID (spatialRelationInfoId-r17) and path loss reference RS configuration information (PathlossReferenceRS-Config-r17). Specifically, with the path loss reference RS being directly configured in the spatial relation information, mapping between the spatial relation information ID and the path loss reference RS is indicated.

[Aspect 3-3]

In aspect 3-3, information indicating mapping between the spatial relation information ID and the path loss reference reference signal (path loss reference RS) is included in ULTCI path loss reference RS configuration information (ULTCI-PathlossReferenceRS-config-r17) being a new RRC parameter. The path loss reference RS may be interpreted as a path loss RS. Specifically, mapping is included in a ULTCI path loss RS (ULTCI-PLRS-r17) that is indicated in the ULTCI path loss reference RS configuration information.

FIG. 17 is a diagram to show the ULTCI path loss reference RS configuration information according to aspect 3-3. As shown in FIG. 17, the ULTCI path loss reference RS configuration information being a new RRC parameter includes a ULTCI path loss RS (ULTCI-PLRS-r17) corresponding to ULTCI path loss RS mapping (ULTCI-PLRS-mapping-r17). Further, the ULTCI path loss RS (ULTCI-PLRS-r17) includes a spatial relation information ID (spatialRelationInfoId-r17) and a path loss reference RSID (PathlossReferenceRS-Id-r17). Specifically, the ULTCI path loss reference RS configuration information indicates mapping between the spatial relation information ID and the path loss reference RS.

[Aspect 3-4]

In aspect 3-4, information indicating mapping between the spatial relation information ID and the path loss reference reference signal (path loss reference RS) is included in ULTCI path loss RS mapping configuration information (ULTCI-PLRS-mapping-config-r17) being a new RRC parameter. The path loss reference RS may be interpreted as a path loss RS.

FIG. 18A is a diagram to show the ULTCI path loss reference RS configuration information according to aspect 3-4. The ULTCI path loss reference RS configuration information (ULTCI-PathlossReferenceRS-config-r17) shown in FIG. 18A is a new RRC parameter, and includes a path loss reference RS (PathlossReferenceRS-r17).

FIG. 18B is a diagram to show the ULTCI path loss RS mapping configuration information according to aspect 3-4. The ULTCI path loss RS mapping configuration information (ULTCI-PLRS-mapping-config-r17) being a new RRC parameter shown in FIG. 18B includes a ULTCI path loss RS (ULTCI-PLRS-r17) corresponding to the ULTCI path loss RS mapping (ULTCI-PLRS-mapping-r17). Further, the ULTCI path loss RS (ULTCI-PLRS-r17) includes a spatial relation information ID (spatialRelationInfoId-r17) and a path loss reference RSID (PathlossReferenceRS-Id-r17). Specifically, the ULTCI path loss RS mapping configuration information indicates mapping between the spatial relation information ID and the path loss reference RS.

[UE Operation]

In power control of the PUCCH/SRS/PUSCH, when the UE receives the spatial relation information (spatialRelationInfo-r17), the UE acquires mapping between the spatial relation information ID and the path loss reference RS (path loss reference RSID). When the spatial relation information ID for PUCCH resource/SRS resource/PUSCH transmission is configured (indicated), the UE determines the path loss reference RS, based on the spatial relation information ID and acquired mapping. The spatial relation information ID is, for example, configured (indicated) by at least one of the MAC CE and the DCI, from a list that is configured by RRC.

Note that at least a part of Embodiment 1 and Embodiment 3 is related to determination of the path loss reference RS of PUCCH power control. At least a part of Embodiment 2 and Embodiment 3 is related to determination of the path loss reference RS of PUSCH power control.

According to Embodiment 3, the UE can appropriately determine the path loss reference RS used for PUCCH/PUSCH/SRS transmission power control, and can thus appropriately control PUCCH/PUSCH/SRS transmission power and prevent deterioration of communication throughput.

<Additional Notes>

In the present disclosure, "SpatialRelationInfo-r17" may be interpreted as "UL TCI-state r17" or "UL beam management r17." The processing according to the present disclosure may be applied only when the UE reports capability information for supporting the TCI state (UL beam management according to Rel. 17). One report for all channels may be performed, or a report may be performed for each channel (for example, the PUCCH/PUSCH/SRS).

Cross channel configuration of the UL TCI may be permitted. For example, a UL TCI ID corresponding to UL TCI configuration configured for a certain channel (SRS/PUCCH/PUSCH) may be configured for the UL TCI of another channel (SRS/PUCCH/PUSCH). The channel may be interpreted as a signal.

Cross BWP/CC configuration of the UL TCI may be permitted. For example, a UL TCI ID corresponding to UL TCI configuration configured for a certain BWP/CC (for example, BWP #1/CC #1) may be configured for another BWP/CC (for example, BWP #2/CC #2).

There are two interpretations regarding the UL TCI according to the present disclosure. The interpretations are to "replace" or "add" the current spatial relation. When the UL TCI replaces the current spatial relation, the UL TCI needs to include power control.

When the UL TCI is added to the current spatial relation, the power control indication need not be included in the UL TCI. When the UL TCI is configured with the power control indication, the UE assumes this indication regarding high-speed transmission power control (TPC). Otherwise, the UE may assume Rel. 15/16 regarding the TPC (the current spatial relation mechanism for controlling the TPC).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

FIG. 19 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 20:
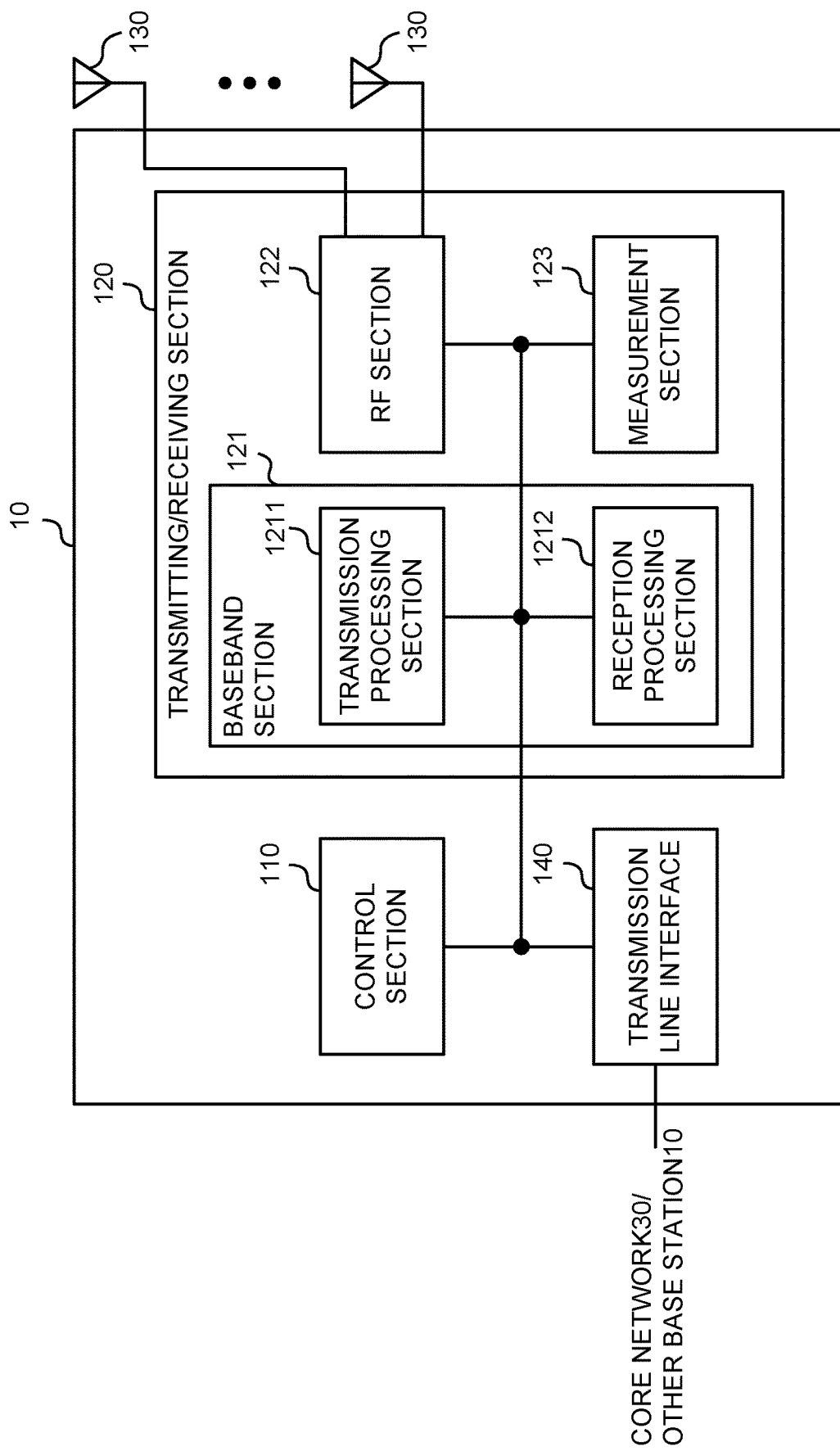
FIG. 20 is a diagram to show an example of a structure of a base station according to one embodiment.

FIG. 20 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmission section and the receiving section of the base station 10 in the present disclosure may be constituted with at least one of the transmitting/receiving section 120, the transmitting/receiving antennas 130, and the transmission line interface 140.

The transmitting/receiving section 120 may transmit specific information indicating mapping between an identifier of spatial relation information and a parameter related to PUCCH transmission power control by using higher layer signaling.

The control section 110 may control reception of a PUCCH to which the parameter related to the PUCCH transmission power determined based on the mapping is applied.

The transmitting/receiving section 120 may transmit downlink control information (DCI) including specific information different from a sounding reference signal resource indicator (SRI), and transmit mapping between the specific information and a parameter related to uplink shared channel (PUSCH) transmission power control by using higher layer signaling.

The control section 110 may control reception of a PUSCH to which a parameter used for the PUSCH transmission power control determined based on the specific information and the mapping is applied.

The transmitting/receiving section 120 may transmit information indicating mapping between an identifier of spatial relation information and a path loss reference signal by using higher layer signaling.

The control section 110 may control reception of a signal in which the path loss reference signal determined based on the indicated identifier of the spatial relation information and the mapping is applied to transmission power control.

(User Terminal)

Figure 21:
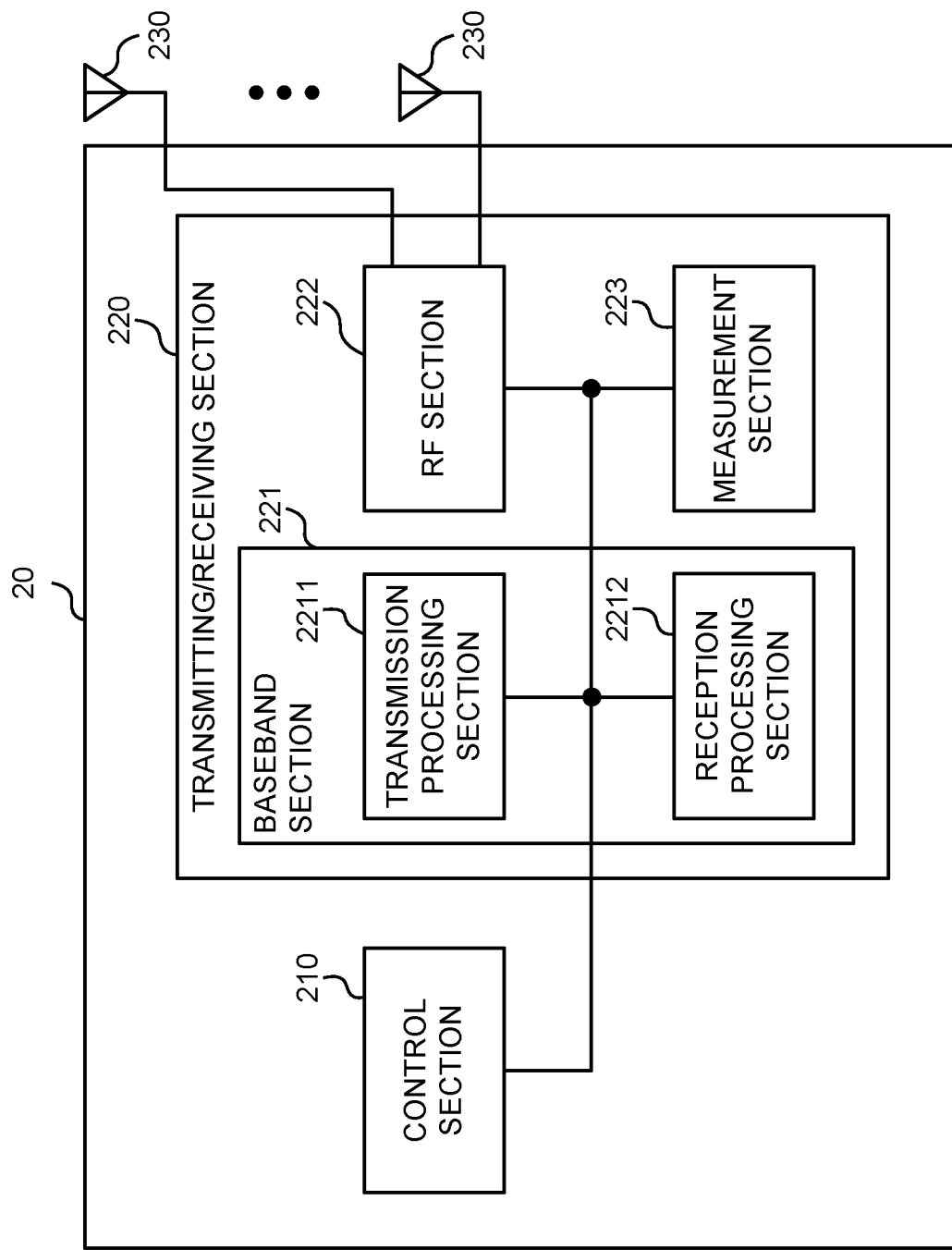
FIG. 21 is a diagram to show an example of a structure of a user terminal according to one embodiment.

FIG. 21 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive specific information indicating mapping between an identifier of spatial relation information and a parameter related to uplink control channel (PUCCH) transmission power control by using higher layer signaling. The specific information may be a PUCCH power control information element. The specific information may be information that does not include a reference signal used for spatial relation, unlike a PUCCH power control information element. The specific information may include information indicating a downlink reference signal used for spatial relation and a downlink reference signal used for path loss estimation.

The control section 210 may determine the parameter related to the PUCCH transmission power, based on the mapping.

The transmitting/receiving section 220 may receive downlink control information (DCI) including specific information different from a sounding reference signal resource indicator (SRI), and receive mapping between the specific information and a parameter related to uplink shared channel (PUSCH) transmission power control by using higher layer signaling. The specific information may be uplink transmission configuration indication (ULTCI). The specific information may be an identifier of spatial relation information.

The control section 210 may determine a parameter used for the PUSCH transmission power control, based on the specific information and the mapping.

The transmitting/receiving section 220 may receive information indicating mapping between an identifier of spatial relation information and a path loss reference signal by using higher layer signaling. The transmitting/receiving section 220 may receive the spatial relation information including information indicating the mapping. The transmitting/receiving section 220 may receive uplink transmission configuration indication (ULTCI) path loss reference signal configuration information including information indicating the mapping.

The control section 210 may determine the path loss reference signal used for transmission power control, based on the indicated identifier of the spatial relation information and the mapping.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 22:
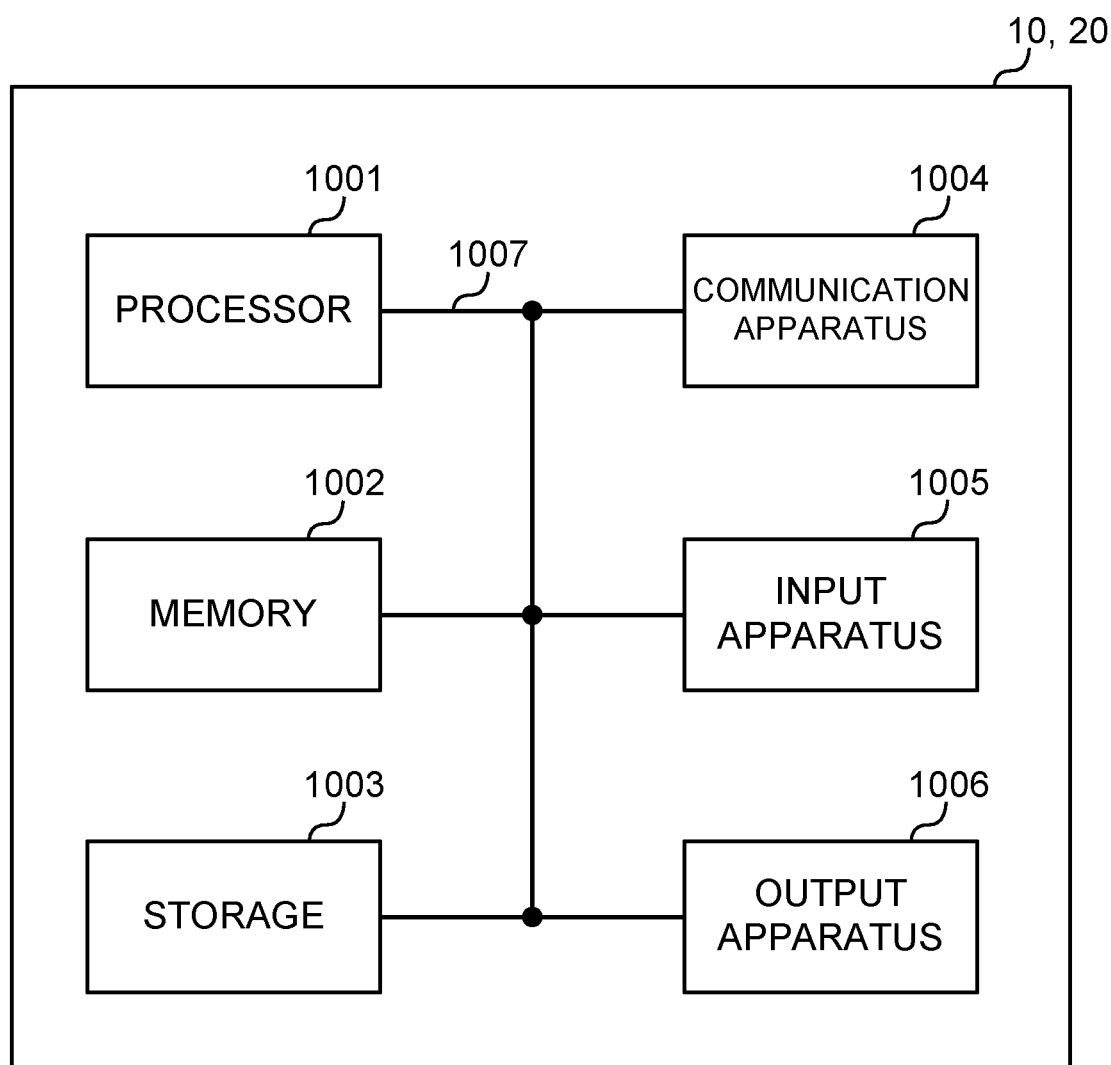
FIG. 22 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 22 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), x-th generation mobile communication system (xG) (xG (x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a transmitter that reports capability information supporting a transmission configuration indication (TCI) state of uplink (UL);
   a receiver that receives downlink control information (DCI) indicating a UL TCI state identifier, and receives, by higher layer signaling, a mapping between the UL TCI state identifier and a parameter related to uplink (UL) shared channel (PUSCH) transmission power control; and
   a processor that determines, based on the UL TCI state identifier and the mapping, a parameter used for the PUSCH transmission power control after the transmitter reports the capability information,
   wherein the processor determines, based on a configuration of power control of a PUSCH by a Sounding reference signal Resource Indicator (SRI), a parameter used for the PUSCH transmission power control in response to the transmitter not reporting the capability information, and
   wherein the configuration includes an identifier of a PUSCH path loss reference Reference Signal (RS) and a closed loop index.

2. A radio communication method for a terminal, comprising:
   reporting capability information supporting a transmission configuration indication (TCI) state of uplink (UL);
   receiving downlink control information (DCI) indicating a UL TCI state identifier, and receiving, by higher layer signaling, a mapping between the UL TCI state identifier and a parameter related to uplink (UL) shared channel (PUSCH) transmission power control; and
   determining, based on the UL TCI state identifier and the mapping, a parameter used for the PUSCH transmission power control after the terminal reports the capability information,
   wherein, in response to the terminal not reporting the capability information, determining, based on a configuration of power control of a PUSCH by a Sounding reference signal Resource Indicator (SRI), a parameter used for the PUSCH transmission power control, and
   wherein the configuration includes an identifier of a PUSCH path loss reference Reference Signal (RS) and a closed loop index.

3. A base station, comprising:
   a receiver that receives capability information supporting a transmission configuration indication (TCI) state of uplink (UL);
   a transmitter that transmits downlink control information (DCI) indicating a UL TCI state identifier, and transmits, by higher layer signaling, a mapping between the UL TCI state identifier and a parameter related to uplink (UL) shared channel (PUSCH) transmission power control; and
   a processor that controls reception of a PUSCH to which a parameter used for the PUSCH transmission power control is applied, the parameter being determined based on the UL TCI state identifier and the mapping, after the receiver receives the capability information,
   wherein the processor controls reception of the PUSCH to which a parameter used for the PUSCH transmission power control determined based on a configuration of power control of a PUSCH by a Sounding reference signal Resource Indicator (SRI) is applied in response to the receiver not receiving the capability information, and
   wherein the configuration includes an identifier of a PUSCH path loss reference Reference Signal (RS) and a closed loop index.

4. A system comprising a terminal and a base station, wherein
   the terminal comprises:
      a transmitter of the terminal that reports capability information supporting a transmission configuration indication (TCI) state of uplink (UL);
      a receiver of the terminal that receives downlink control information (DCI) indicating a UL TCI state identifier, and receives, by higher layer signaling, a mapping between the UL TCI state identifier and a parameter related to uplink (UL) shared channel (PUSCH) transmission power control; and
      a processor of the terminal that determines, based on the UL TCI state identifier and the mapping, a parameter used for the PUSCH transmission power control after the transmitter of the terminal reports the capability information,
      wherein the processor of the terminal determines, based on a configuration of power control of a PUSCH by a Sounding reference signal Resource Indicator (SRI), a parameter used for the PUSCH transmission power control in response to the transmitter of the terminal not reporting the capability information, and
   the base station comprises:
      a receiver of the base station that receives the capability information;
      a transmitter of the base station that transmits the DCI and the higher layer signaling; and
      a processor of the base station that controls reception of a PUSCH to which the parameter used for the PUSCH transmission power control is applied, the parameter being determined based on the UL TCI state identifier and the mapping, after the receiver of the base station receives the capability information,
      wherein the processor of the base station controls reception of the PUSCH to which the parameter used for the PUSCH transmission power control determined based on the configuration is applied in response to the receiver of the base station not receiving the capability information, and
      wherein the configuration includes an identifier of a PUSCH path loss reference Reference Signal (RS) and a closed loop index.

* * * * *